US009692693B2

(12) United States Patent
Kompella

(10) Patent No.: US 9,692,693 B2
(45) Date of Patent: *Jun. 27, 2017

(54) BANDWIDTH CONTROL FOR RING-BASED MULTI-PROTOCOL LABEL SWITCHED PATHS

(71) Applicant: Juniper Networks, Inc., Sunnyvale, CA (US)

(72) Inventor: Kireeti Kompella, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/319,185

(22) Filed: Jun. 30, 2014

(65) Prior Publication Data

US 2015/0381483 A1    Dec. 31, 2015

(51) Int. Cl.
*H04L 12/723* (2013.01)
*H04L 12/24* (2006.01)
(Continued)

(52) U.S. Cl.
CPC ........ *H04L 45/507* (2013.01); *H04L 41/0896* (2013.01); *H04L 47/724* (2013.01);
(Continued)

(58) Field of Classification Search
None
See application file for complete search history.

(56) References Cited

U.S. PATENT DOCUMENTS 7,184,437 B1    2/2007    Cole et al.
7,545,735 B1    6/2009    Shabtay et al.
(Continued)

FOREIGN PATENT DOCUMENTS

EP    1528731 A2    4/2005
EP    1679842 A1    7/2006
(Continued)

OTHER PUBLICATIONS

Extended Search Report from counterpart European Application No. 15160593.8, dated Oct. 29, 2015, 9 pp.
(Continued)

*Primary Examiner* — Andrew Oh
(74) *Attorney, Agent, or Firm* — Shumaker & Sieffert, P.A.

(57) ABSTRACT

Techniques are described for specifying and constructing multi-protocol label switching (MPLS) rings. Routers may signal membership within MPLS rings and automatically establish ring-based label switch paths (LSPs) as components of the MPLS rings for packet transport within ring networks. In one example, a router includes a processor configured to establish an MPLS ring having a plurality of ring LSPs. Each of the ring LSPs is configured to transport MPLS packets around the ring network to a different one of the routers operating as an egress router for the respective ring LSP. Moreover, each of the ring LSPs comprises a bidirectional, multipoint-to-point (MP2P) LSP for which any of the routers can operate as an ingress to source packet traffic into the ring LSP for transport to the respective egress router for the ring LSP. Separate protection paths, bypass LSPs, detours or loop-free alternatives need not be signaled.

17 Claims, 16 Drawing Sheets

(51) Int. Cl.
  *H04L 12/911* (2013.01)
  *H04L 12/933* (2013.01)
  *H04L 12/917* (2013.01)
  *H04L 12/913* (2013.01)
  *H04L 12/801* (2013.01)

(52) U.S. Cl.
  CPC ............ *H04L 47/76* (2013.01); *H04L 47/825* (2013.01); *H04L 49/102* (2013.01); *H04L 47/13* (2013.01)

(56) References Cited

U.S. PATENT DOCUMENTS

| | | | |
|---|---|---|---|
| 7,742,482 B1* | 6/2010 | Aggarwal | H04L 12/5695 370/395.3 |
| 7,965,656 B1 | 6/2011 | Wijnands et al. | |
| 7,990,993 B1 | 8/2011 | Ghosh et al. | |
| 8,050,559 B2 | 11/2011 | Sindhu | |
| 8,611,359 B1 | 12/2013 | Kompella et al. | |
| 2002/0060985 A1 | 5/2002 | Lee et al. | |
| 2002/0150062 A1* | 10/2002 | Zheng | H04L 45/00 370/331 |
| 2003/0037162 A1 | 2/2003 | Kotser | |
| 2004/0151159 A1* | 8/2004 | Xu | H04Q 11/0062 370/351 |
| 2004/0213228 A1 | 10/2004 | Tingle et al. | |
| 2005/0094554 A1* | 5/2005 | Nakash | H04L 12/437 370/222 |
| 2005/0094577 A1* | 5/2005 | Ashwood-Smith | H04L 45/50 370/257 |
| 2006/0221816 A1* | 10/2006 | Nagata | H04J 3/14 370/216 |
| 2007/0036162 A1 | 2/2007 | Tingle et al. | |
| 2007/0115913 A1* | 5/2007 | Li | H04L 12/4633 370/349 |
| 2007/0206618 A1* | 9/2007 | Zelig | H04L 12/4637 370/404 |
| 2007/0280251 A1 | 12/2007 | Wang et al. | |
| 2008/0044181 A1 | 2/2008 | Sindhu | |
| 2008/0123650 A1* | 5/2008 | Bhaskar | H04L 45/16 370/392 |
| 2008/0170496 A1* | 7/2008 | Kano | H04L 41/0896 370/225 |
| 2008/0172497 A1 | 7/2008 | Mohan et al. | |
| 2009/0180401 A1 | 7/2009 | Guan | |
| 2010/0214913 A1* | 8/2010 | Kompella | H04L 12/5695 370/230 |
| 2010/0232287 A1* | 9/2010 | Long | H04L 45/02 370/220 |
| 2011/0044348 A1 | 2/2011 | Kini et al. | |
| 2012/0008632 A1* | 1/2012 | Liu | H04L 47/724 370/395.5 |
| 2012/0069847 A1 | 3/2012 | Saad et al. | |
| 2012/0155327 A1* | 6/2012 | Fondelli | H04L 45/50 370/254 |
| 2012/0207017 A1* | 8/2012 | Ceccarelli | H04L 12/437 370/227 |
| 2012/0308225 A1* | 12/2012 | Long | H04L 45/04 398/13 |
| 2013/0047193 A1 | 2/2013 | Finkelstein | |
| 2013/0094355 A1 | 4/2013 | Nakash | |
| 2013/0155874 A1* | 6/2013 | Sha | H04L 43/0811 370/242 |
| 2013/0259056 A1 | 10/2013 | Kotrabasappa et al. | |
| 2013/0336159 A1 | 12/2013 | Previdi et al. | |
| 2014/0198634 A1 | 7/2014 | Kumar et al. | |
| 2014/0204946 A1* | 7/2014 | Li | H04L 12/433 370/392 |
| 2014/0211664 A1 | 7/2014 | Peng | |
| 2014/0313886 A1 | 10/2014 | Yuan et al. | |
| 2014/0330920 A1 | 11/2014 | Shao | |
| 2014/0348028 A1 | 11/2014 | Chen | |
| 2015/0128223 A1* | 5/2015 | Magri | H04L 45/42 726/4 |
| 2015/0138947 A1 | 5/2015 | Nainar et al. | |
| 2015/0281045 A1* | 10/2015 | Torvi | H04L 45/28 370/228 |

FOREIGN PATENT DOCUMENTS

| | | |
|---|---|---|
| WO | 0036871 A1 | 6/2000 |
| WO | 2013059966 A1 | 5/2013 |

OTHER PUBLICATIONS

Yasukawa, "Supporting Multipoint-to-Point Label Switched Paths in Multiprotocol Label Switching Traffic Engineering," Network Working Group, IETF, Internet Draft, draft-yasukawa-mpls-mp2p-rsvpte-06.txt, Oct. 19, 2009, 22 pp.
Li et al. "IS-IS Extensions for Traffic Engineering" Network Working Group, RFC 5305, Oct. 2008, 17 pgs.
Katz et al. "Traffic Engineering (TE) Extensions to OSPF Version 2" Network Working Group, RFC 3630, Sep. 2003, 14 pgs.
Examination Report from counterpart European Application No. 15160593.8, dated Oct. 31, 2016, 6 pp.
Response to Extended Search Report dated Oct. 29, 2015, from counterpart European Application No. 15160593.8, filed Jul. 5, 2016, 4 pp.
Metro Ethernet Forum Technical committee: "Metro Ethernet Protection", http://metroethernefforum.org/_root/members/bostonmeeting/mef_protection_0_30.pdf, Oct. 25, 2001, 28 pp.
Yang et al., "Multiprotocol Label Switching Transport Profile Ring Protection Analysis", MPLS Working Group, draft-yang-mpls-tp-ring-protection-analysis-01, May 1, 2009, 11 pp.
Response to Communication pursuant to Article 94(3) EPC dated Oct. 31, 2016, from counterpart European Application No. 15160593.8, filed on Feb. 28, 2017, 11 pp.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
|                RING LSP ANCHOR IP ADDRESS (4 OR 16 OCTETS)    |
|        RING ANCHOR INDEX       |            RING LSP ID        |
|            RING ID             |
```
— 70

FIG. 7

```
 0                   1                   2                   3
 0 1 2 3 4 5 6 7 8 9 0 1 2 3 4 5 6 7 8 9 0 1 2 3 4 5 6 7 8 9 0 1
|   NUMBER OF IPV4 ENTRIES       |    NUMBER OF IPV6 ENTRIES    |
|                     IPV4 ENTRY (4 OCTETS)                     |
|           LABEL (20 BITS)            |E|MBZ|     METRIC        |
|                                ...                            |
|                     IPV6 ENTRY (16 OCTETS)                    |
|           LABEL (20 BITS)            |E|MBZ|     METRIC        |
|                                ...                            |
```
— 72

FIG. 8

BANDWIDTH CONTROL FOR RING-BASED MULTI-PROTOCOL LABEL SWITCHED PATHS

TECHNICAL FIELD

The disclosure relates to computer networks and, more particularly, to engineering traffic flows within computer networks.

BACKGROUND

Routing devices within a network, often referred to as routers, maintain routing information that describes available routes through the network. Upon receiving an incoming packet, the router examines information within the packet and forwards the packet in accordance with the routing information. In order to maintain an accurate representation of the network, routers exchange routing information in accordance with one or more defined routing protocols, such as the Border Gateway Protocol (BGP).

Multi-Protocol Label Switching (MPLS) is a suite of protocols used to engineer traffic patterns within Internet Protocol (IP) networks. By utilizing MPLS, a source device can request a path through a network to a destination device, i.e., a Label Switched Path (LSP). An LSP defines a distinct path through the network to carry MPLS packets from the source device to a destination device. Each router along a LSP allocates a label and propagates the label to the closest upstream router along the path. Routers along the path cooperatively perform MPLS operations to forward the MPLS packets along the established path. A variety of protocols exist for establishing LSPs, such as the Label Distribution Protocol (LDP) and the Resource Reservation Protocol with Traffic Engineering extensions (RSVP-TE).

MPLS protocols such as these have been successful in many types of networks including core service provider networks and wide area networks (WAN). However, applying MPLS protocols in access networks can be difficult because many access networks are arranged as a ring topology. Due to ring topology, path protection mechanisms such as RSVP-TE Fast re-route (FRR) and LDP FRR may be inefficient and complex. Moreover, conventional MPLS protocols are typically not sufficiently flexible nor do they scale well for widespread adoption in ring-based access networks.

SUMMARY

In general, multi-protocol label switching (MPLS) signaling mechanisms are described herein that allow "MPLS rings" to be specified and signaled as a new MPLS construct. As a result, routers may signal membership therein with MPLS rings and automatically establish traffic engineered label switch paths (LSPs) as components of the MPLS rings for packet transport within ring networks. Moreover, as described in further detail below, bandwidth allocation need not be separately provisioned at the time a ring LSP is established, but may be deduced and allocated in real-time based on traffic or services being transported by the routers. Further, the techniques described herein can provide built-in path protection as a natural result of the signaling mechanisms and definitions specified herein for MPLS rings. As a result, separate protection paths, bypass LSPs, or detours need not be signaled.

In one example, a method comprises establishing, with a plurality of routers connected to form a ring network, a multi-protocol label switching (MPLS) ring having a plurality of ring label switched paths (LSPs), each of the ring LSPs configured to transport MPLS packets around the ring network to a different one of the routers operating as an egress router for the respective ring LSP, wherein each of the ring LSPs comprises a multipoint-to-point (MP2P) LSP for which any of the routers within the ring network can operate as an ingress to source packet traffic into the ring LSP for transport to the respective egress router for the ring LSP. The method further includes forwarding network traffic as MPLS packets around the ring network in accordance with the ring LSPs.

In another example, a router comprises a plurality of physical interfaces interconnecting the router as one of a plurality of routers forming a ring network. The router further includes a processor configured to establish a MPLS ring having a plurality of ring LSPs, each of the ring LSPs configured to transport MPLS packets around the ring network to a different one of the routers operating as an egress router for the respective ring LSP, wherein each of the ring LSPs comprises a MP2P LSP for which any of the routers within the ring network can operate as an ingress to source packet traffic into the ring LSP for transport to the respective egress router for the ring LSP. The router further includes a forwarding component to forward network traffic as MPLS packets around the ring network in accordance with the ring LSPs.

In another example, a computer-readable storage medium comprises instructions that cause a network device to output a plurality of messages in accordance with a label distribution protocol to establish, with a plurality of routers connected as a ring network, a MPLS ring having a plurality of ring LSPs around the ring network, wherein each of the ring LSPs is configured to transport MPLS packets around the ring network to a different one of the routers operating as an egress router for the respective ring LSP, and wherein each of the ring LSPs comprises a MP2P LSP for which any of the routers within the ring network can operate as an ingress to source packet traffic into the ring LSP for transport to the respective egress router for the ring LSP.

In another example, a method comprises discovering, with an interior gateway routing protocol (IGP), a plurality of routers that are designated as members of a MPLS ring associated with a network in which the routers are interconnected in a ring topology. The method includes, responsive to the discovery, establishing, with the plurality of routers, a plurality of ring LSPs for the MPLS ring, each of the ring LSPs configured to transport MPLS packets around the ring network to a different one of the routers operating as an egress router for the respective ring LSP. Each of the ring LSPs comprises a MP2P LSP for which any of the routers within the ring network can operate as an ingress to source packet traffic into the ring LSP for transport to the respective egress router for the ring LSP. The method further includes forwarding network traffic as MPLS packets around the ring network in accordance with the ring LSPs.

In another example, a router comprises a plurality of physical interfaces interconnecting the router as one of a plurality of routers forming a ring network, and a processor executing an IGP. The processor is configured to discover, using the IGP, neighboring ones of the routers that are members of a MPLS ring associated with the ring network. The processor is further configured to, responsive to discovering the neighboring routers that are members of the MPLS ring, establish a plurality of ring LSPs for the MPLS ring. Each of the ring LSPs is configured to transport MPLS packets around the ring network to a different one of the routers that is designated as an egress router for the respective ring LSP. Each of the ring LSPs is configured as a MP2P LSP for which any of the routers within the ring network can operate as an ingress to source packet traffic into the ring LSP for transport to the respective egress router for the ring LSP. The router includes forwarding component to forward network traffic as MPLS packets around the ring network in accordance with the ring LSPs.

In another example, a computer-readable storage device stores instructions that cause a processor to receive enhanced IGP messages from neighboring ones of a plurality of routers that are designated as members of a MPLS ring associated with a ring network, wherein each of the enhanced IGP messages specifies an identifier of the MPLS ring to indicate that the respective router is a member of the MPLS ring and specifies an index that indicates the position around the MPLS ring for the respective router. The instructions further cause the processor to select, based on the IGP messages and along the ring network, an upstream neighboring one of the routers and a downstream one of the neighboring routers, and output messages to the upstream neighboring one of the routers and the downstream one of the neighboring routers in accordance with a label distribution protocol to establish a plurality of ring LSPs for the MPLS ring.

In another example, a method comprises outputting, with a plurality of routers connected as a ring network, a plurality of messages in accordance with a label distribution protocol to establish a MPLS ring having at least one ring LSP to transport MPLS packets around the ring network to one of the routers operating as an egress router for the ring LSP, wherein the ring LSP comprises a MP2P LSP for which any of the routers within the ring network can operate as an ingress to source packet traffic into the ring LSP for transport to the egress router for the ring LSP. Each of the messages output by the routers specifies bandwidth requirements in a downstream direction to the egress router for any packet traffic to be sourced into the ring LSP by the respective one of the routers around the ring LSP. The method includes forwarding network traffic as MPLS packets around the ring network in accordance with the ring LSP.

In another example, a router comprises a plurality of physical interfaces interconnecting the router as one of a plurality of routers forming a ring network. A processor executes a label distribution protocol to communicate with the other routers using messages to establish a ring LSP configured to transport MPLS packets around the ring network to one of the routers operating as an egress router for the ring LSP, wherein the processor is configured to establish the ring LSP as a MP2P LSP for which any of the routers within the ring network can operate as an ingress to source packet traffic into the ring LSP for transport to the egress router for the ring LSP, and wherein the messages specify bandwidth requirements in a downstream direction to the egress router for any packet traffic to be sourced into the ring LSP by the router. A forwarding component to forward network traffic as MPLS packets around the ring network in accordance with the ring LSP.

In another example, a method comprises establishing, with a plurality of routers connected to form a ring network, a ring LSP configured to transport MPLS packets around the ring network to one of the routers operating as an egress router for the ring LSP, wherein the ring LSP comprises a bidirectional MP2P LSP for which any of the routers within the ring network can operate as an ingress to source packet traffic into the ring LSP for transport to the egress router for the ring LSP in either an upstream direction or a downstream direction around the ring network. The method further comprises forwarding network traffic as MPLS packets around the ring network in the downstream direction to the egress router in accordance with the ring LSP, detecting, with any one of the routers, a network event that would prevent the MPLS packets from reaching the egress router in the downstream direction, and automatically redirecting the MPLS packets at the one of the routers detecting the network event from the downstream direction of the ring LSP to the upstream direction of the ring LSP to forward the MPLS packets around the ring in the upstream direction to the egress router. Similar techniques may be applied to protect upstream traffic.

In another example a router comprises a plurality of physical interfaces interconnecting the router as one of a plurality of routers forming a ring network, and a processor configured to establish, a ring LSP configured to transport MPLS packets around the ring network to one of the routers operating as an egress router for the ring LSP, wherein the ring LSP comprises a bidirectional MP2P LSP for which any of the routers within the ring network can operate as an ingress to source packet traffic into the ring LSP for transport to the egress router for the ring LSP in either an upstream direction or a downstream direction around the ring network. The router further comprises a forwarding component to forward network traffic as MPLS packets around the ring network in accordance with the ring LSP, wherein the forwarding component is programmed by the processor to, in response to a network event, automatically redirect the MPLS packets from the downstream direction of the ring LSP to the upstream direction of the ring LSP to forward the MPLS packets around the ring in the upstream direction to the egress router. Similar techniques may be applied to protect upstream traffic.

The techniques may provide certain advantages. For example, the techniques described herein allow a ring LSP to be created as a loop for which the LSP starts and ends with the same node. In one example implementation, each node operates to anchor a respective ring LSP, and each LSP is a MP2P bidirectional LSP that starts and ends at the same node at which traffic for the LSP is egressed (i.e., the node at which traffic exits the LSP). As such, an MPLS ring can be defined and specified for a ring network of n nodes according to the techniques herein and can be constructed to have up to n ring LSPs, each ring LSP having a different anchoring (egress) node of the ring. In this way, only n ring LSPs are used to provide full connectivity for the ring network, rather than n*(n−1) point-to-point LSPs as would be needed for full connectivity using conventional techniques.

As another example, unlike traditional RSVP signaling in which RSVP PATH message having an explicit route object (ERO) starts at an ingress for the LSP and is sent along all the nodes of the LSP to the egress, the techniques described herein allow a ring LSP to be formed as a multi-point to point LSP for which any member node of the ring LSP may signal membership of the ring LSP without first needing to receive a RSVP PATH message from an upstream node. That is, once a network device (node) discovers or is otherwise configured with membership of a ring, each member network device may autonomously signal membership in the ring LSP without dependency on receiving MPLS messages, such as label distribution messages, from other member network devices.

As another example, according to example implementations described herein, explicit bandwidth for a ring LSP need not be expressly signaled at the time the ring LSP is being established. Instead, bandwidth may be requested and provisioned dynamically for the ring LSP as individual member nodes of the ring network join the MPLS ring and as traffic services are provisioned on those member nodes. Moreover, equal bandwidth need not be provisioned around the entire ring. Instead, the techniques allow any member node to request allocation of bandwidth around the ring, e.g., in a downstream direction, for supporting bandwidth required by the member node and upstream member nodes. As such, the bandwidth allocation can vary to accommodate aggregated bandwidth requirements around the ring, and can be dynamically updated as traffic is provisioned.

Further, the techniques described herein provide built-in path protection as a natural result of the signaling mechanisms and definitions specified herein for MPLS rings without requiring additional bypass or standby LSPs or other mechanisms such as loop-free alternatives. In addition, hierarchical LSPs need not be expressly signaled and, instead, access LSPs and other point-to-point LSPs may naturally be configured hierarchically over the ring LSPs that are signaled using the techniques described herein.

The details of one or more embodiments are set forth in the accompanying drawings and the description below. Other features, objects, and advantages will be apparent from the description and drawings, and from the claims.

BRIEF DESCRIPTION OF DRAWINGS

FIG. 7 is a block diagram illustrating an example format for an RSVP session object that may be used to signal a ring LSP in accordance with the techniques described herein.

FIG. 8 is a block diagram illustrating an example format for an RSVP label bindings object that may be used to signal label bindings for a ring LSP in accordance with the techniques described herein.

DETAILED DESCRIPTION

Figure 1:
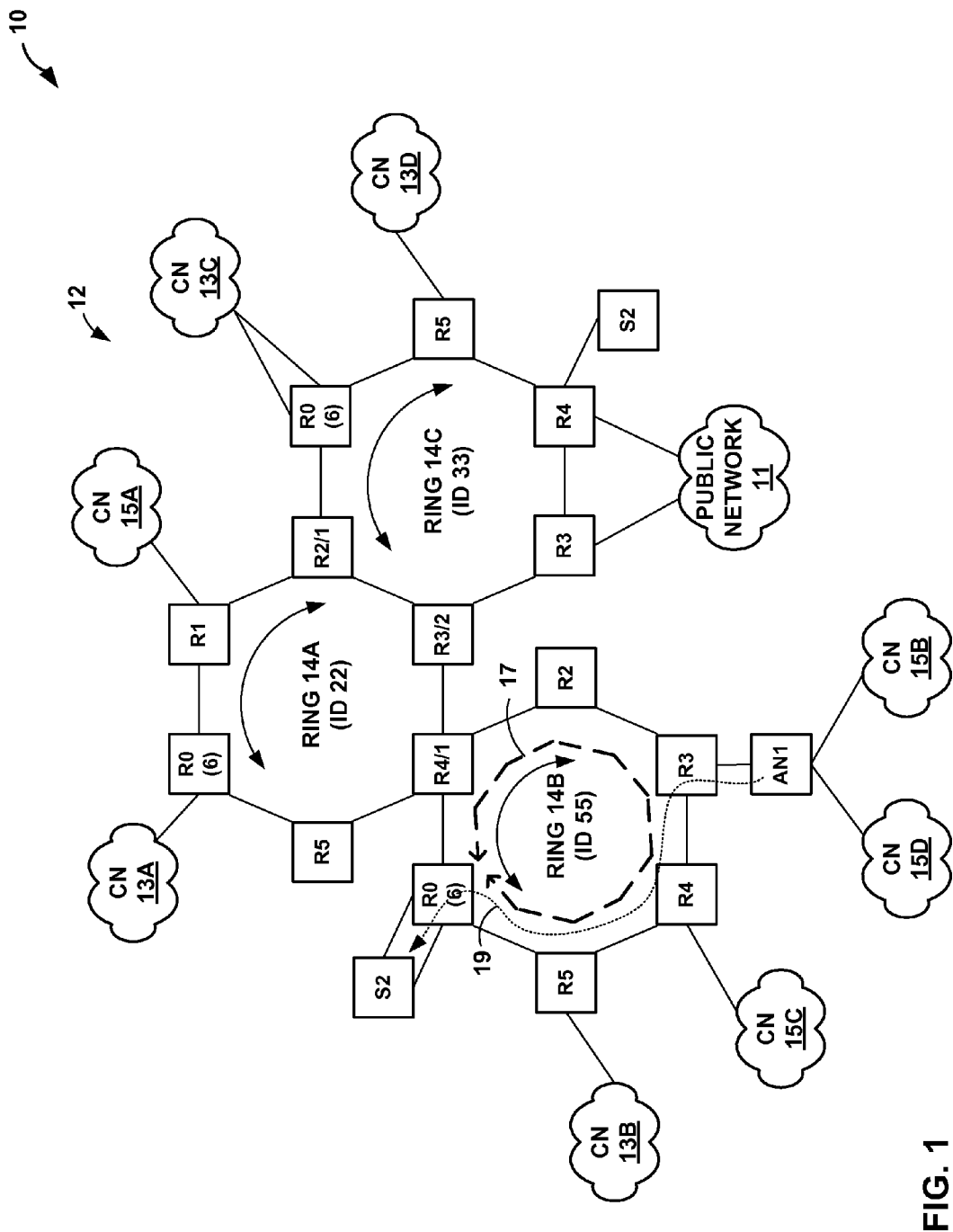
FIG. 1 is a block diagram illustrating an example network system that specifies and utilizes MPLS rings in accordance with techniques described herein.

FIG. 1 is a block diagram illustrating an example network system 10 that specifies and utilizes MPLS rings in accordance with techniques described herein. As shown in the example of FIG. 1, network system 10 includes a service provider network 12 in which a collection of routers ("R") are arranged to form a plurality of ring networks 14A-14C (collectively, ring networks 14). As shown in FIG. 1, ring networks 14 operate as access networks for a plurality of customer networks 13A-13D and 15A-15D. That is, ring networks 14 operate to provide fast packet-based transport of communications between customer networks 13, 15, respectively, and provide the customer networks access to public network 11, such as the Internet or other provider networks.

Each customer network 13, 15 may comprise a private network and may include local area networks (LANs) or wide area networks (WANs) that comprise a plurality of subscriber devices. The subscriber devices may include personal computers, laptops, workstations, personal digital assistants (PDAs), wireless devices, network-ready appliances, file servers, print servers or other devices. In some cases, the subscriber devices request and communicate multicast streams.

In general, the routers within ring networks 14 use the multi-protocol label switching (MPLS) signaling mechanisms described herein to specify and signal "MPLS rings" and membership therein. As a result, the routers automatically establish label switched paths (LSPs) as components of the MPLS rings for packet transport within ring networks 14. These LSPs may be traffic engineered. Moreover, as described in further detail below, the routers need not separately provision bandwidth allocation, but rather the routers may deduce and allocate bandwidth dynamically based on traffic or services being transported by the routers. Further, the techniques described herein provide built-in path protection as a natural result of the signaling mechanisms and definitions specified herein for MPLS rings. As a result, separate protection paths, bypass LSPs, detours or loop-free alternatives need not be computed or signaled.

As described herein, in example implementations an MPLS ring can be defined as follows. Given a graph G=(V, E), where V is a set of vertices (or nodes) and E a set of directed edges (or links), a ring R, such as ring networks 14A-14C, is a sequence of nodes <R0, R1, R2, . . . , Rn>, where n is the number of ring nodes in the ring. A ring node is a router; the links are interfaces between routers. As used herein, R0 is the hub node for a given MPLS ring, and can also be represented as Rn. That is, the hub node for an MPLS ring is both the zeroth and nth node in the MPLS ring. In the example of FIG. 1, MPLS rings for ring networks 14A, 14B and 14C each have a hub node at a respective router R0 that may also be referred to as router R6 (denoted "R0(6)"), since n=6 in each of the example ring networks. For each node i within the sequence of nodes, link (Ri, R(i+1)) and link (R(i+1), Ri) are both in the set of links E. That is, each node in a given MPLS ring is adjacent to the next and previous node in the ring by a pair of bidirectional links. Indices of adjacent nodes in the MPLS ring, other than the hub nodes, differ in this example by an increment of one and increase in a downstream (DS) direction (clockwise in the example of FIG. 1) from hub node R0 to node R(n−1). The other direction is, by way of example, represented as the upstream direction (counterclockwise). For example, in the example of FIG. 1, communications flowing in the downstream direction for the MPLS ring of ring network 14A traverse routers R1-R6 in a clockwise direction as this is the direction in which indices of the routers are defined in increasing order. However, communications flowing in the downstream direction for the MPLS ring of ring network 14C traverse routers R1-R6 in a counterclockwise direction as this is the direction in which indices of the routers are defined in increasing order for the MPLS ring.

Each MPLS ring for ring networks 14A-14C is identified by a ring identifier that is unique across service provider (SP) network 12 or an administrative domain. In this example of FIG. 1, ring networks 14A-14C, are assigned ring identifiers 22, 55 and 33, respectively. An MPLS ring may be constructed by assigning a ring identifier and index to each of the nodes that form the MPLS ring, and assigning a ring identifier to links between ring nodes that are to be used to carry traffic for the MPLS ring. In some examples herein, ring links between a pair of ring nodes may be treated as a single link, although these links may be bundled at the layer two (2) (e.g., as a Link Aggregation Group), or explicitly bundled at the layer three (L3) as a link bundle, or implicitly bundled by virtue of having the same ring ID.

In this way, the techniques described herein may be used to define an MPLS ring, such as by assigning a new, unallocated ring identifier, assigning a hub node (e.g., router 0), and assigning the links that belong to the MPLS ring. This may be performed manually, such as by an administrator or network management system, or automatically by the routers of FIG. 1 by way of discovery using, for example, extensions described herein to an interior gateway protocol (IGP). As one example, as described in further detail below, IGP may be used to discover ring neighbors and ring interfaces. Based on network topology, each node may autonomously elect or may be configured to specify, which of its individual interfaces are coupled to links that form an MPLS ring being established. Using IGP, for example, each router R1-R6 of each of ring networks 14 declares itself as a member of one or more of the MPLS rings and announces its ring identifier for each of the MPLS rings for which it is a member. As further described, each of the hub routers R0 for each of the MPLS rings also declares, based on discovered neighbors, itself as the largest index in the ring (R0→Rn), which allows the MPLS ring to dynamically form as a closed loop.

As shown in the example of FIG. 1, a ring identifier may be useful when a node is a member of more than one MPLS ring. Further, as illustrated in FIG. 1, node indexing and upstream and downstream directions may be different from MPLS ring to MPLS ring. For example, in the MPLS ring of ring network 14A, the direction from router R2/1 to router R3/2 is downstream while in the MPLS ring of ring network 14C the direction is upstream. In FIG. 1, routers R2 and R3 are members of the MPLS ring for ring network 14A and are also members of the MPLS ring for ring network 14C as routers R1 and R2, respectively. Router R4 of the MPLS ring for ring network 14A is a member of ring 14B as router R1. In this example, the number before the '/' is their index in the MPLS ring for ring network 14A and after the '/' is their index in ring 14B or ring 14C. Some of the links incident on router R4/1, therefore, are assigned to ring 14A and some to ring 14B. Other links, not shown, may not be assigned to any ring. The link shown between router R2/1 and router R3/2 is split physically or logically between the MPLS ring for ring network 14A and the MPLS ring for ring network 14C.

In many cases, upon defining MPLS rings, a service provider network may include other non-ring nodes, such as service nodes and access nodes, that may be attached to, but not be part of, the MPLS rings. In the example of FIG. 1, service provider network 12 includes service node 51 and service node S2, where service node S2 is dual-homed to hub node R6 of the MPLS ring for ring network 14B. In addition, service provider network 12 includes access node AN1 that is single-homed to router R3. Non-ring nodes may be one or more hops away from a MPLS ring.

As described herein, in example implementations each ring LSP signaled by the routers starts and ends at the same router (or ring node) Ri. As used herein, Ri is an anchor node for the ring LSP, i.e., where the ring LSP starts and ends. Each ring node is an anchor for one of the n ring LSPs defined on a ring with n nodes.

In general, network 12 may utilize two different types of LSPs: ring LSPs described herein and access LSPs. Access LSPs may be conventional point-to-point (P2P) or point-to-multipoint (P2MP) LSPs. One example of a ring LSP described herein is a bidirectional LSP that starts and ends on the same ring node of an MPLS ring, called the ring LSP anchor, and only traverses the routers of the MPLS ring. As one example, the MPLS ring constructed for ring network 14B includes a ring LSP 17 that starts and ends with router R0 (6). That is, router R0 (6) is the anchoring node for ring LSP 17. Each router within a MPLS ring can initiate one or more ring LSPs, each of the ring LSPs being distinguished by a ring LSP identifier. In contrast, an access LSP is a unidirectional or bidirectional LSP that connects non-ring nodes hierarchically over ring LSPs. For example, access LSP 19 may be used to transport traffic between access node AN1 and service node S2 hierarchically over ring LSPs of the MPLS ring of ring network 14B. For example, traffic from access node AN1 to service node S2 may flow through access LSP 19 over ring LSP 17 anchored by router R6 of the MPLS ring of ring network 14B. Traffic from service node S2 to access node AN1 may flow through bidirectional access LSP 19 or a different access LSP over a different ring LSP (not shown) anchored by router R3 of the MPLS ring of ring network 14B.

Techniques described herein for signaling ring LSPs, such as ring LSP 17, are designed to naturally automate the creation of access LSPs, such as access LSP 19, as a hierarchical LSP. For example, suppose the service provider wishes to create unidirectional access LSP 19 from non-ring access node AN1 connected to R3 of ring network 14B to non-ring service node S2 connected to router R6. This may be accomplished by forming access LSP as a hierarchical LSP by creating: (1) an LSP from access node AN1 to router R3, (2) a hierarchical LSP from router R3 to router R6 over ring LSP 17, and (3) an LSP from router R6 to service node S2. Service node S2 may advertise an LSP to router R6 using LDP, for example. In accordance with the techniques described herein, as further described in reference to FIG. 8, router R6 advertises not only labels for use with respect to ring LSP 17, but may also advertise a label to reach service node S2 in RSVP PATH and RESV messages for ring LSP 17. These RSVP messages may be propagated to router R3, which can in turn advertise reachability for service node N2 to access node AN1, e.g., via label distribution using the Address Resolution Protocol (L-ARP). In this way, the signaling techniques described herein facilitate creation of hierarchical access LSPs over ring LSPs.

As further described below, the techniques disclosed herein provide ring LSPs that may have a number of benefits. For example, the techniques described herein may allow for signaling ring LPS that may be highly scalable. Since, in an example implementation, a ring LSP is a bidirectional, multipoint LSP, the ring LSP allows for a packet flow to be directed onto the ring LSP at any ring node and in either direction. The techniques described herein provide scalability by allowing the number of LSPs (k) per node (n) of a ring to require only up to n*k ring LSPs rather than a full mesh of 2*(n^2)*k point-to-point conventional LSPs. This in turn means that the state per node of the ring may only be n*k bidirectional ring LSPs instead of (n^2)*k unidirectional LSPs.

As another example, the techniques provided herein allow for auto-configuration by which each node is able to automatically create the ring LSPs for which it is the anchor. Further, the techniques provide for automatic bandwidth management. For example, as described herein the bandwidth reserved on a single ring LSP is not fixed but instead can change hop-by-hop around the ring. A bandwidth-managed connection accounts for the bandwidth requirements of access LSPs that "hop on" to a ring LSP at any ring node.

Moreover, the ring LSPs may provide bidirectional, resilient connectivity with fast restoration among ring nodes. The bidirectionality of LSPs is used to provide resilience. If a link or node fault is detected in a given direction, traffic is automatically switched to the other direction; the destination node remains the same. Fast effective restoration may be ensured by a protection switch pre-programmed into the forwarding tables.

Further, as described, the techniques may provide for auto-hierarchical access LSPs between service and access nodes attached to the ring, which simplifies access LSPs and makes them more scalable.

Figure 2A:
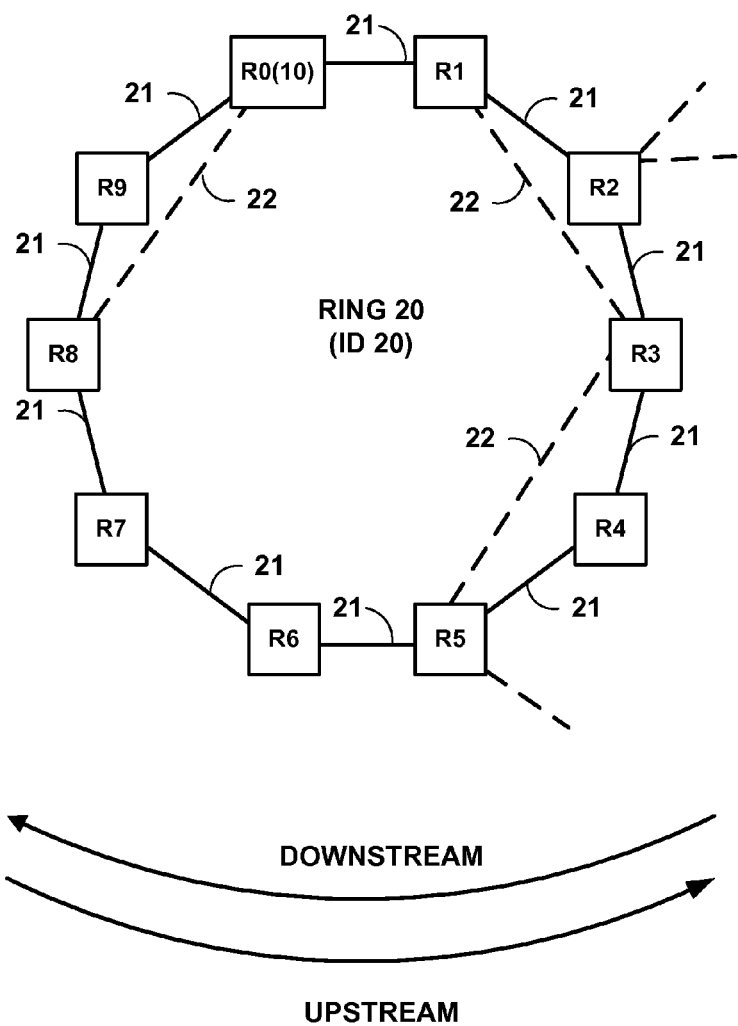
FIGS. 2A-2C are block diagrams illustrating in further detail examples of signaling and construction of an MPLS ring within a network having a ring topology.

FIG. 2A illustrates in further detail an example ring network 20. In this example, ring network 20 comprises ten (10) routers R1-R10 and has been assigned an identifier 20. Each router has a plurality of ring network interfaces that couple the router to neighboring routers of ring network 20 via ring links 21. As shown in FIG. 2A, the routers R1-R10 may be coupled by additional links 22 that have been determined, e.g., by an administrator or automatically by the routers, as excluded from ring network 20 in favor of links 21.

Figure 2B:
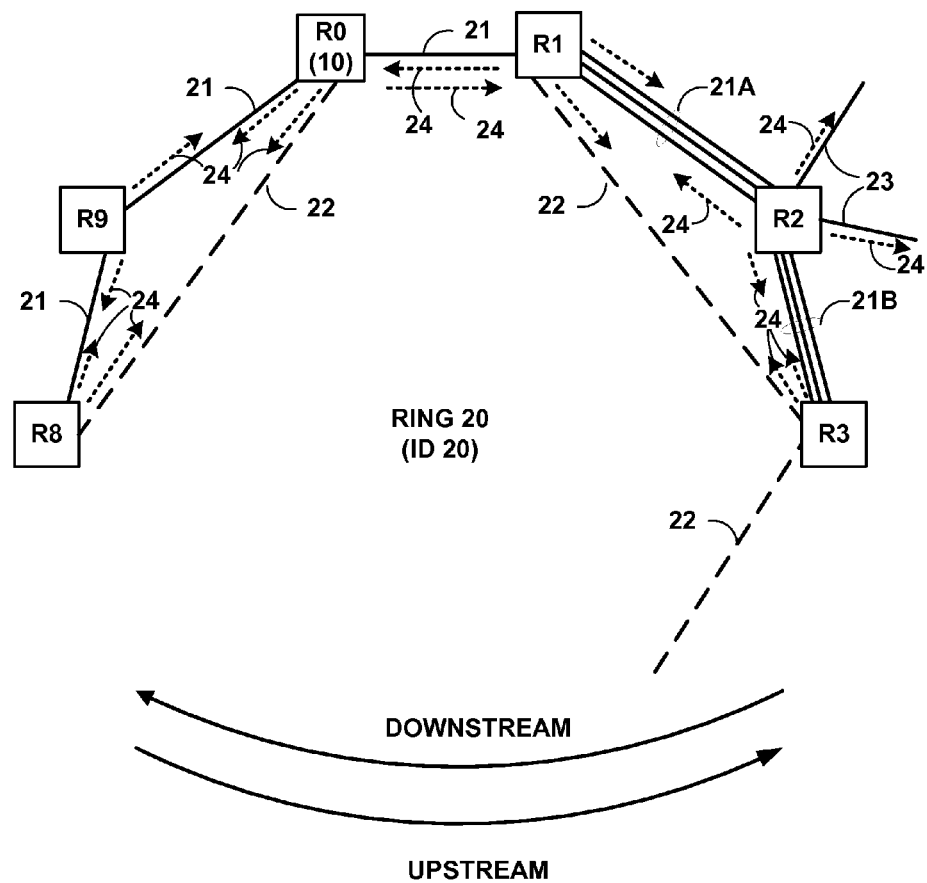

FIG. 2B illustrates a portion of ring network 20 in further detail. In this example, routers R1-R10 utilize extensions to an interior routing protocol, such as IGP, to discover MPLS rings and member nodes associated with ring network 20. For example, as shown in FIG. 2B, each of routers R1-R10 may output enhanced IGP messages 24 on each interface to announce ring membership and identify neighboring nodes that are members of the same MPLS ring. IGP message may conform to, for example, ISIS or OSPF messages, as further described below.

In this example, router R2 is coupled to both R1 and R3 by a respective set of multiple links 21A and 21B. Each set of multiple links 21A, 21B may be bundled at the layer two (2) (e.g., as a Link Aggregation Group), or explicitly bundled at the layer three (L3) as a link bundle, or implicitly bundled by virtue of having the same ring ID. Initially, router R2 outputs enhanced IGP messages 24 on each of its physical and/or logical interface, where the IGP messages carry additional data structures (e.g., Type-Length-Value structures, or TLVs) specifying, for each MPLS ring, a ring identifier and an index for router R2 on the respective ring. In the example of FIG. 2, each of the enhanced IGP messages 24 output by router R2 may carry an identifier of '20' for MPLS ring of ring network 20 and an index of '2' indicating the position around MPLS ring 20 for router R2. Definition of the ring identifier and each node index may be performed manually, such as by an administrator or network management system, or automatically by the routers of FIG. 1 by way of discovery using, for example, extensions described herein to an interior gateway protocol (IGP). In this way, IGP may be used to discover ring neighbors and ring interfaces.

More specifically, initially each router R1-R10 configured as a member of the MPLS ring of ring network 20 sends enhanced IGP messages on all interfaces, where the IGP messages specify the ring identifier and the ring index of the advertising node. Based on topology learned from the enhanced IGP messages 24, each node may independently select the physical interfaces and links that define the ring. That is, responsive to the enhanced IGP messages 24, each node dynamically determines its interface by which to reach the upstream neighboring router and the downstream neighboring router of the MPLS ring.

To select its downstream facing interface(s), each router R1-R10 listens to incoming enhanced IGP messages 24 and selects, based on the IGP messages, one or more of its interfaces over which an enhanced IPG message was received that identified the MPLS ring (i.e., MPLS ring '20' for ring network 20 in this example) and that included an index from a neighboring node that was the lowest index received that still exceeds the routers own index for the MPLS ring. In the example of FIG. 2B, router R2 receives enhanced IGP messages 24 via links 21B from router R3 having an index of '3.' In response, router R2 having and index of '2' selects one or more of its interfaces to links 21B as components of MPLS ring 20 for reaching its downstream neighbor router R3. As another example, router R1 receives enhanced IGP messages 24 from router R2 having an index of '2' via links 21A. In addition, router R1 receives enhanced IGP messages 24 from router R3 having index '3.' In response, router R1 having an index of '1' selects one or more of its interfaces to links 21A as components of MPLS ring 20 for reaching its downstream neighbor router R2 since index '2' is less than index '3' and still exceeds index '1' of router R1. Each of the routers R1-R10 perform this process autonomously to select downstream neighbors based on the enhanced IGP messages 24 that each router may continuously and periodically output on its interfaces.

To select its upstream facing interface(s), each router R1-R10 listens to all enhanced IGP messages 24 received on its interfaces and selects, based on the IGP messages, one or more of its interfaces over which an IGP message was received that identified MPLS ring '20' and that included an index from a neighboring node that was the highest index less than its own index. In the example of FIG. 2B, router R2 receives enhanced IGP messages 24 via links 21A from router R1 having an index of '1.' In response, router R2 having and index of '2' selects one or more of its interfaces to links 21A as components of MPLS ring 20 for reaching its upstream neighbor router R1. Similarly, router R3 receives enhanced IGP messages 24 from router R2 having an index of '2' via links 21A. In addition, router R3 receives enhanced IGP messages 24 from router R1 having index '1.' In response, router R3 having and index of '3' selects one or more of its interfaces to links 21B as components of MPLS ring 20 for reaching its upstream neighbor router R2 since index '2' is greater than index '1' of router R1 and less than index '3' of router R3. Each of the routers R1-R10 perform this process autonomously to select upstream neighbors based on the enhanced IGP messages 24 that each router may continuously and periodically be outputting on its interfaces.

Router 10(0) is configured with an index of '0,' thereby designated router R0 as the hub of the MPLS ring. As such, router R0 announces itself on all of its interfaces as being a member of MPLS ring '20' for ring network 20 and having and index of zero '0.' In addition, router R0 listens to all incoming enhanced IGP messages 24 on its interfaces and identifies the neighboring router having the highest index. In this example, router R0 receives an enhanced IGP message having from router R9 carrying a ring identifier of '20' and an index of '9,' an enhanced IGP message having from router R8 carrying a ring identifier of '20' and an index of '8,' and an enhanced IGP message having from router R1 carrying a ring identifier of '20' and an index of '1.' As such, router R0 determines router R1 is its downstream neighbor. In addition, router R0 determines that index '9' is the highest index of all of its neighboring nodes and, in response, selects router R9 as its upstream neighbor. Further, based on this selection, router R0 outputs enhanced IGP messages 24 identifying itself as having both indexes '0' and '10,' where router R0 computed index '10' as one greater than the index of its upstream neighbor R9 that advertised the highest index for MPLS ring '20'. This process allows router R9 to select router 0 (10) as its downstream neighbor, thereby closing MPLS ring '20'.

In this way, the techniques described herein provide for automatically discovering node membership of MPLS rings. Moreover, the techniques allow for member nodes to dynamically and automatically adjust the size and topology of MPLS rings in response to events and network topology changes.

Figure 2C:
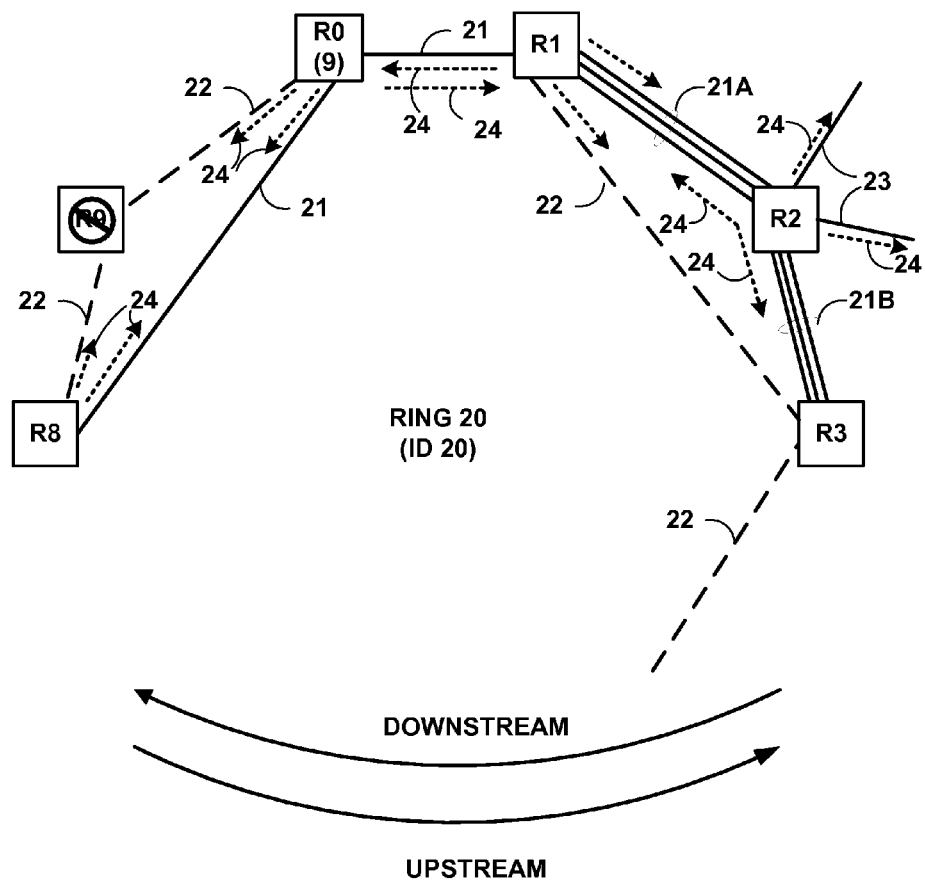

As one example, FIG. 2C illustrates an example of ring network 20 in which router R9 has become temporarily offline. As examples, router R9 may have been expressly taken offline for maintenance or may have stopped operating due an internal error. In any event, the discovery techniques described above with allow the routers to construct MPLS ring '20' so as to dynamically convergence to a different size based on the currently available topology of ring network 20. In this example, router R0 ceases to receive enhanced IGP messages 24 from router R9 and, instead, received enhanced IGP messages 24 from router R8 and router R1. According to the techniques described herein, after failing to receive IGP messages 24 from router R9 for a threshold period of time, router R0 selects router R8 as its upstream neighbor and announces itself as having indexes '0' and '9.' Similarly, router R8 receives enhanced IGP messages 24 from routers R7 and R0(9) and selects its upstream neighbor as R7 and its downstream neighbor as router R0(9), thereby forming a closed MPLS ring 20 shown in FIG. 2C and adapting to the network event of original router R9 ceasing operation. Similarly, the dynamic discovery techniques allow the routers to expand the size of the MPLS ring '20' for ring network 20 when supported by the network topology.

Figure 3:
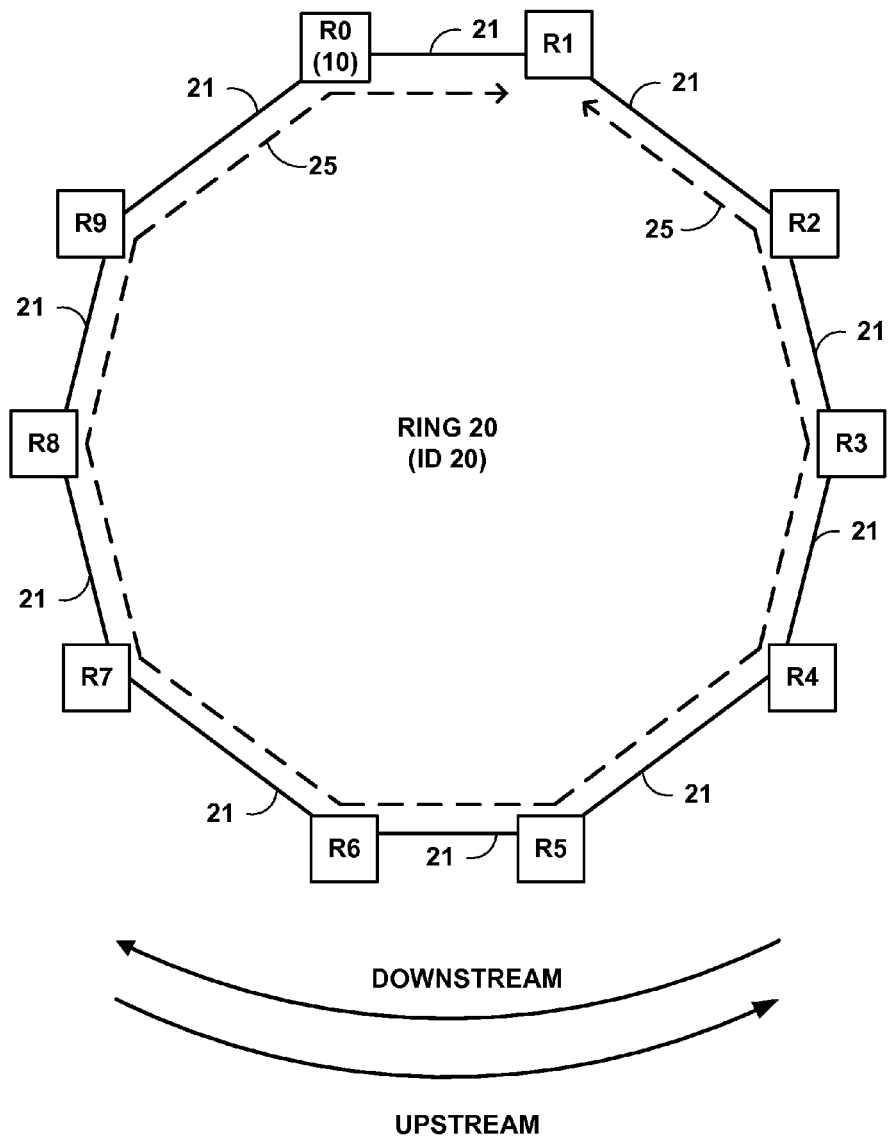
FIG. 3 is a block diagram illustrating an example ring LSP signaled for the MPLS of the ring network.

FIG. 3 further illustrates MPLS ring 20 once established for ring network 20 and, moreover, illustrates an example ring LSP 25 created for the MPLS ring upon completion of the signaling of the ring as described above. As described herein, the MPLS ring topology established for the MPLS ring may be constructed by routers R1-R10 to comprise ten separate ring LSPs, each anchored at a different one of the ten routers R1-R10. That is, in one example implementation, each router R1-R10 is associated with a respective ring LSP and each ring LSP is a multipoint-to-point (MP2P) bidirectional LSP that starts and ends at that anchoring router. As such, an MPLS ring of n nodes can be defined and specified according to the techniques herein and can be constructed to have n ring LSPs providing full connectivity for the ring, each of the ring LSPs having a different anchoring (egress) node of the ring. As such, the techniques may provide full connectivity within a ring of n routers using n ring LSPs as described herein rather than a full mesh of n*(n−1) point-to-point LSPs using conventional techniques.

In the example of FIG. 3, an example ring LSP 25 is shown associated with anchoring router R1. That is, in this example, router R1 of the MPLS ring '20' defined for ring network 20 provides a bidirectional multipoint communication from all of the other routers of the ring network 20. As shown, ring LSP 25 starts and ends with router R1. Every other router R2-R10 is able to source packet traffic, i.e., operate as an ingress, for ring LSP 25. For all MPLS traffic traversing ring LSP 25, router R1 operates as an egress.

Although not shown in FIG. 3, a similar corresponding ring LSP can be automatically created for each of the other respective routers R2-R10. Moreover, as each ring LSP associated with the MPLS ring specified for ring network 20 is a bidirectional MP2P LSP, each of routers R1-R10 can send traffic to any of the other routers in either a downstream (clockwise) direction or upstream direction (counterclockwise) using the ring LSP anchored at the router to which the traffic is being sent.

In general, every ring node participates in the creation of all ring LSPs for the network ring. In the example of FIG. 3, ring LSP 25 is anchored at router R1 and has two primary data paths: one in the downstream direction going R1, R2, . . . , R10 and the other in the upstream direction going R10, R9, . . . , R1. Any ring node, say router R8, can send traffic to router R1 in either the downstream or upstream direction using ring LSP 25. Typically, traffic will be sent in the direction with fewer hops, but some traffic (e.g., best effort traffic, where latency is not an issue) may be sent the other direction. As another example, traffic may be load balanced across both directions.

When establishing one or more ring LSPs for MPLS ring '20' of ring network 20, each of routers R1-R10 learns, either through auto-discovery described above or configuration, that it is a node of a defined ring. As described above, through a learning process, each of routers R1-R10 is able to learn the index for other ring nodes on the ring and is able to autonomously select the interfaces and links to be used for the ring. See, for example, FIGS. 2A-2C above. In addition, each of routers R1-R10 autonomously signals each individual ring LSP of the ring network. For example, each of routers R1-R10 may autonomously output RSVP PATH and RESV messages for each ring LSP of the ring network, even for those ring LSPs for which the router is operating as an intermediate node. In other words, the signaling of each ring LSP may occur at each router R1-R10 of ring network 20 autonomously without being triggered by receipt of a PATH or RESV message from a neighboring router along the ring. In one example, RSVP PATH messages are automatically sent in the downstream direction and contain a corresponding upstream label for the advertising router and any traffic specification (TSPEC) for the data to be carried by the ring LSP. In this way, the RSVP PATH messages automatically create the upstream LSP of the bidirectional ring LSP. RSVP RESV messages are automatically issued by each router of the ring network and are sent in the upstream direction. The RSVP RESV messages advertise a downstream label for the sending router, may include an upstream TSPEC and automatically create the downstream LSP of the bidirectional ring LSP.

As further described below with respect to FIGS. 7-8, routers R1-R10 may use a new RSVP session object and label bindings object presented herein for signaling ring LSPs, such as ring LSP 25. In this example, there is no need for a LABEL REQUEST or an ERO to be used in either the RSVP RESV messages or the RSVP PATH message. Moreover, routers R1-R10 may use the new RSVP objects to automatically create hierarchical LSPs, such as when forming access LSP 19 over ring LSP 17 of FIG. 1.

In general, at each node within an MPLS ring (such as at any of routers R1-R10 of the MPLS ring for ring network 20), three types of ring LSP traffic operations may occur within a forwarding plane of the router: "add", "transit", or "drop" traffic. Moreover, each type of traffic can flow in the downstream (DS) or upstream (US) directions. Downstream traffic being added to the ring may arrive at any node from non-ring nodes connected to the ring node. Downstream transit traffic arrives at each ring node from its upstream neighbor on one or more interfaces selected as components of the ring. Downstream drop traffic at an anchoring ring node for an LSP is all of the transit traffic that arrives at the node from its upstream neighbors and is sent to non-ring nodes connected to and reachable through the anchoring node. Similar upstream traffic exists for any given ring node.

Figure 4A:
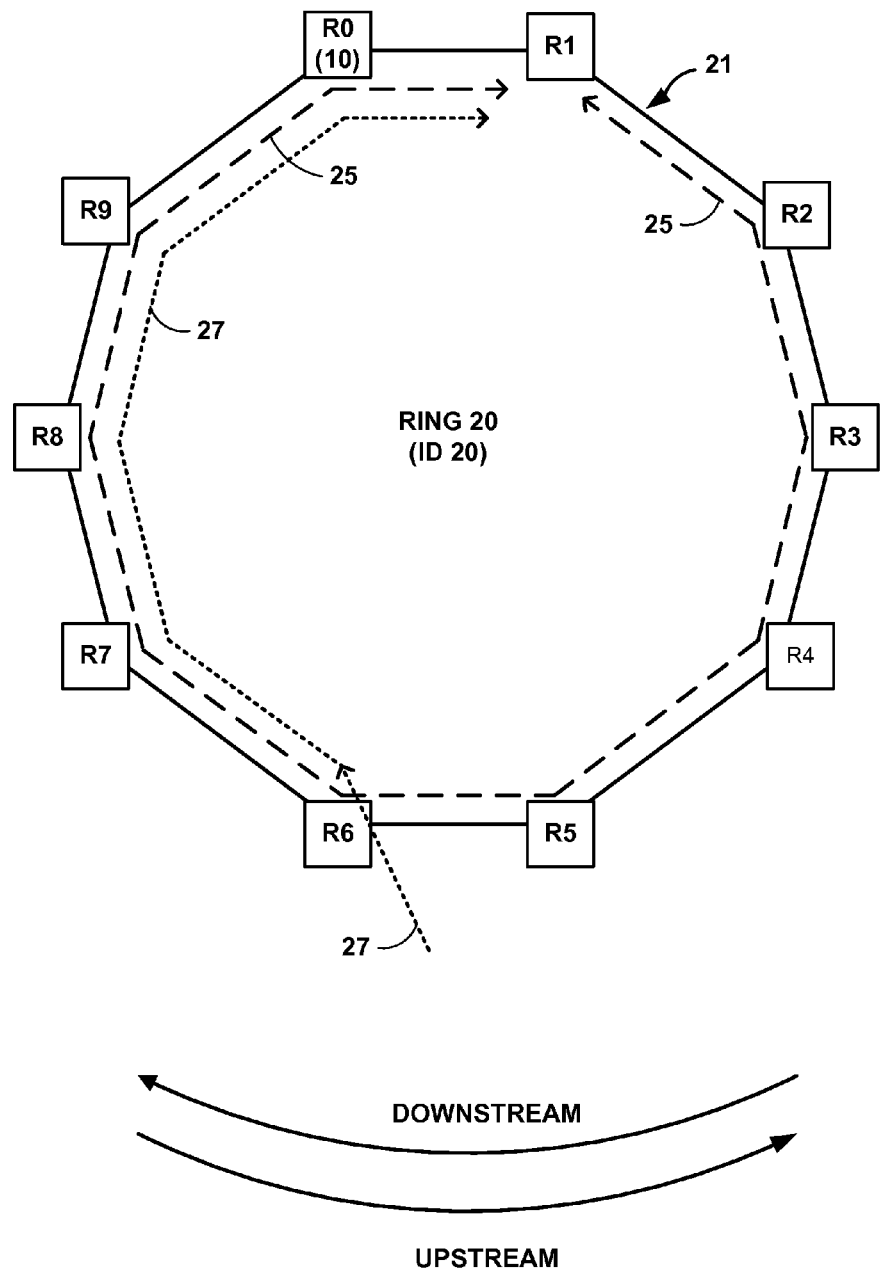
FIGS. 4A-4D are block diagrams illustrating the MPLS ring and demonstrating the protection that is automatically built-in to the ring LSPs constructed according to the techniques described herein.

FIGS. 4A-4D illustrate the MPLS ring described above and demonstrate the protection that is automatically built-in to the ring LSPs constructed according to the techniques described herein. In the example of FIG. 4A, router R6 is operating as an ingress for ring LSP 25 and communicating packet traffic 27 in MPLS form to router R1 in a downstream direction.

Figure 4B:
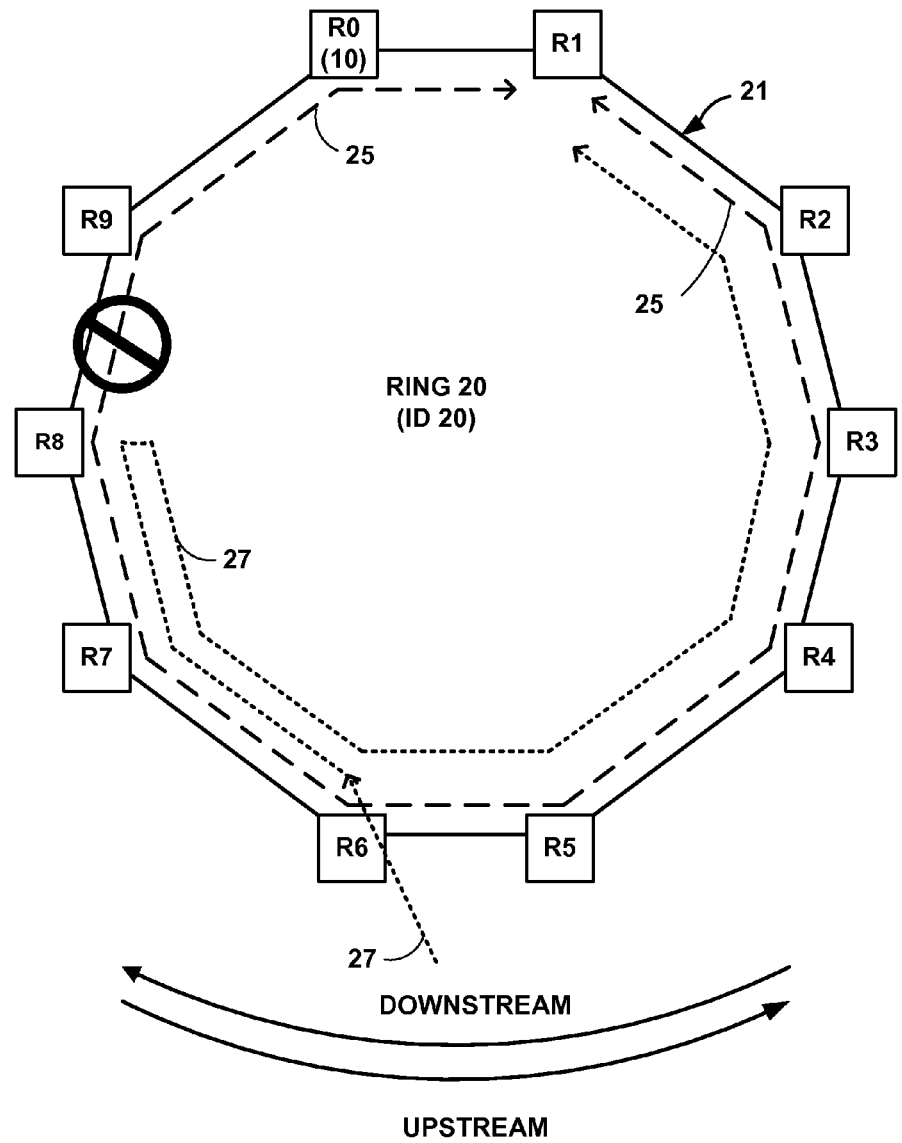

In the event a link between router R8 and router R9 fails, as shown in FIG. 4B, router R8 immediately, upon detecting the local link failure, directs downstream forwarded traffic on LSP 25 along the upstream component of the bidirectional ring LSP 25. As such, the traffic automatically flows around ring network 20 to router R1 in the upstream direction along LSP 25.

Figure 4C:
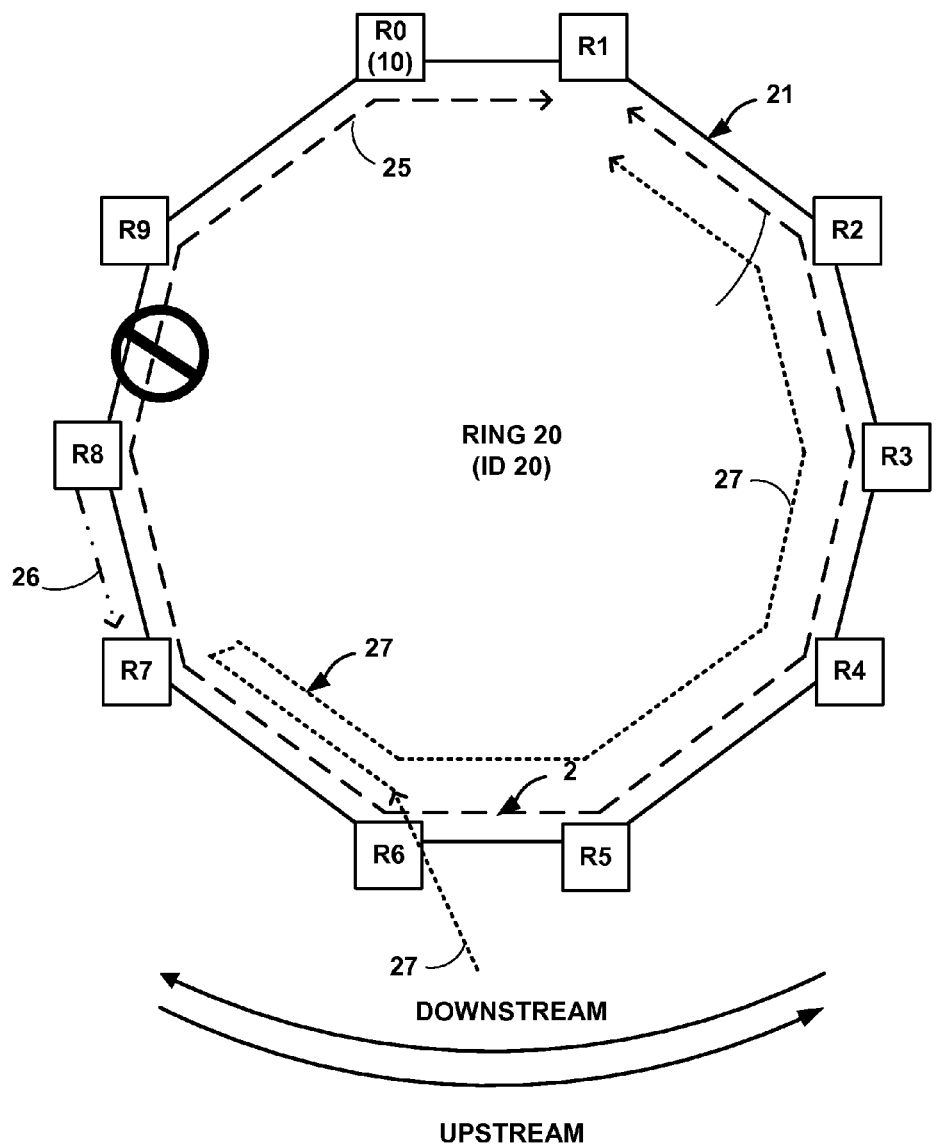
Figure 4D:
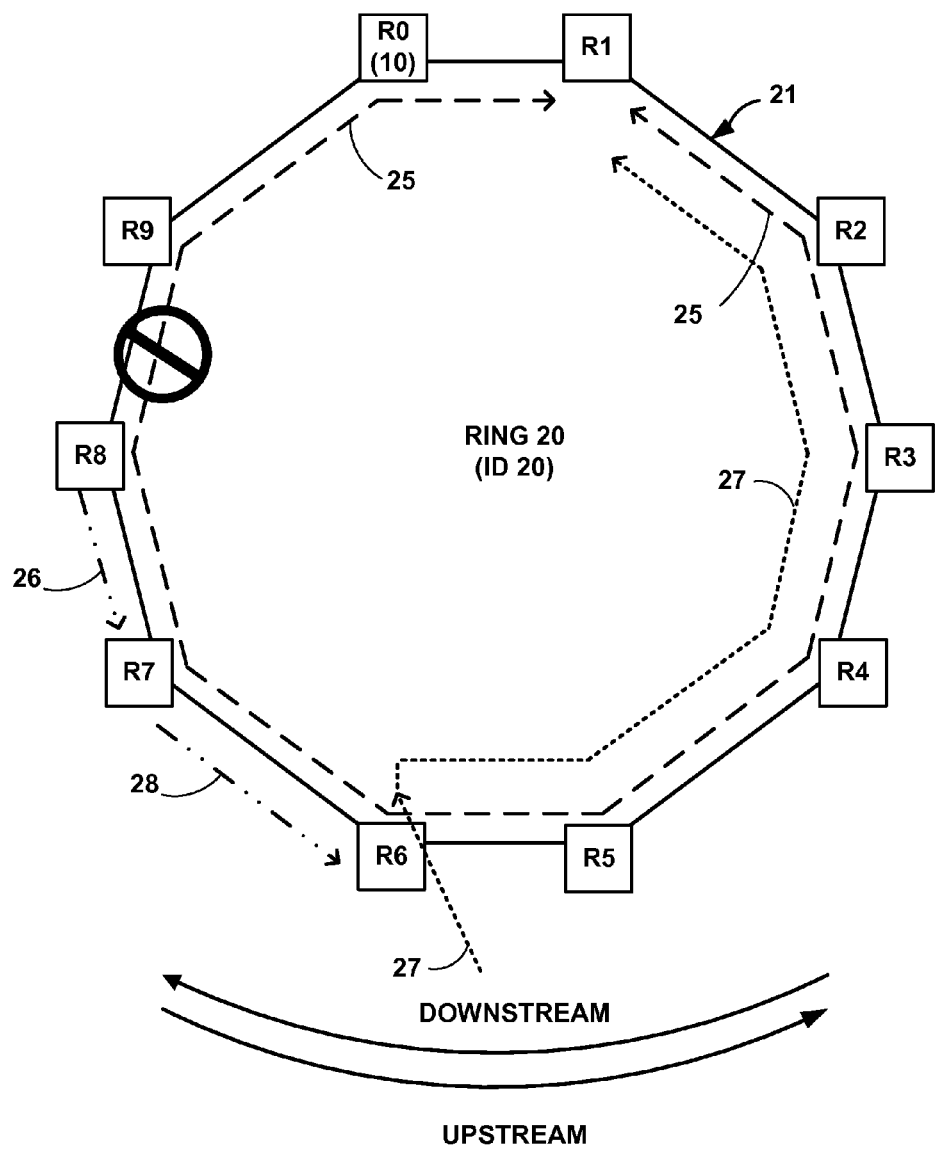

Further, as illustrated in FIG. 4C, router R8 outputs a notification message 26 to inform router R7 of the link failure. As one example, router R8 may output an RSVP PATH ERR message indicating that that the downstream portion of ring LSP 25 is unavailable. In response, router R7 updates its forwarding plane and operates to reverse downstream traffic on LSP 25 to forward the traffic in the upstream direction along LSP 25 to router R1. Similarly, as shown in FIG. 4D, router R7 outputs a notification message 28 to inform router R6 of the link failure. In response, router R6 updates its forwarding plane and, since router R6 is the source of the traffic in this example, injects the traffic directly into LSP 25 in the upstream direction to forward the traffic along LSP 25 to router R1. In this way, the ring LSPs described herein naturally responds to link failures along the ring and operate to reverse the direction of traffic along the ring until the traffic is injected and forwarded in the reverse direction.

In this way, in case of disruption of one direction of a ring LSP, packets are looped onto the other direction of the LSP within which they are current being forwarded. In some examples, this reroute action is pre-programmed in a forwarding information based (FIB) of a forwarding integrated circuit of the nodes to minimize the time between detection of a fault and the corresponding recovery action. Further, the fast reroute (FRR) actions described herein use active LSPs, and hence do not require computing or signaling additional backup, bypass, detour or loop-free alternative (LFA) paths.

Moreover, unlike conventional techniques that make use of a full mesh of P2P LSPs, the techniques allow traffic to flow in the reverse direction around the MPLS ring directly to the egress of the ring LSP 25, i.e., router R1. For example, in response to the link failure shown in FIG. 4B using conventional techniques, router R8 may have redirected traffic from one P2P LSP to a different P2P LSP, causing the traffic to flow entirely around ring network 20 to router R9 in a counter-clockwise direction only to have router R9 forward the traffic back to router R1 in a clockwise direction.

Figure 5:
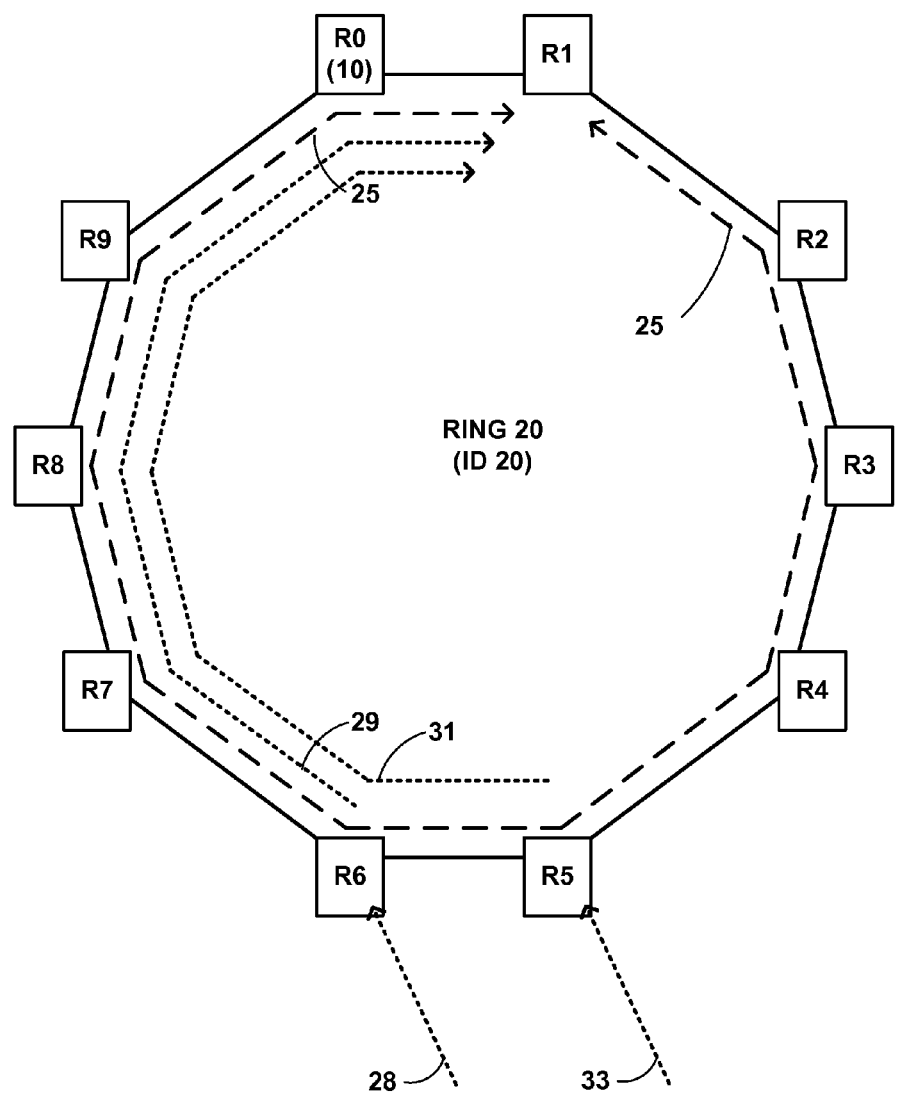
FIG. 5 is a block diagram illustrating the MPLS ring and demonstrating the dynamic bandwidth management provided by MPLS rings constructed in accordance with the signaling mechanisms described herein.

FIG. 5 illustrates the MPLS ring described above and demonstrates the dynamic bandwidth management provided by MPLS rings constructed in accordance with the signaling mechanisms described herein. As further described below, explicit bandwidth for ring LSP 25 need not be expressly signaled at the time the ring LSP is being established. Instead, bandwidth may be requested and provisioned dynamically for ring LSP 25 as individual nodes (routers R1-R10) of ring network 20 join the MPLS ring and as traffic services are provisioned on those member nodes. Moreover, equal bandwidth need not be provisioned around the entire MPLS ring. Instead, the techniques allow any member node to request allocation of bandwidth around the MPLS ring, e.g., in a downstream direction, for supporting bandwidth required by the member node and upstream member nodes. As such, the bandwidth allocation can vary to accommodate aggregated bandwidth requirements around the ring, and can be dynamically updated as traffic is provisioned.

Initially, ring LSP 25 is signaled and provisioned with zero (0) bandwidth. Later, as actual services are provisioned on individual member nodes of the MPLS ring for ring LSP 25, their bandwidth requirements are added to the bandwidth allocation for ring LSP 25. Moreover, the allocations are added to and accounted for by ring LSP 25 from the point at which traffic for the services enter the ring LSP 25 and downstream therefrom.

In the example of FIG. 5, router R6 is provisioned with a pseudowire to carry inbound traffic 28, where the pseudowire is configured for 1 Gigabit per second of bandwidth. As such, router R6 outputs an updated RSVP PATH message 29 to inform downstream routers that 1 Gigabit per second of bandwidth has been reserved for ring LSP 25. For example, router R6 may output an updated RSVP PATH message 29 in which the traffic specification (TSPEC) is updated to reflect the new downstream traffic that the downstream routers R7-R10 should expect. Each of the downstream routers performs admission control based on the updated value. If successful, the service is accepted. If not, the rejecting downstream router may issue an RSVP PATH ERR message in the upstream direction with an admission control error. Upon receiving an RSVP PATH ERR message, the upstream router may reject all or portions of the incoming traffic 28 being provisioned until the downstream routers accept the RSVP PATH message 29 having the reduced TSPEC. Alternatively, the upstream router may send an RSVP PATH ERR message in the upstream direction to cause further upstream along the ring to be dropped.

Subsequently, router R5 may be similarly provisioned with a pseudowire to carry inbound traffic 33, where the pseudowire is configured for 1 Gigabit per second of bandwidth. As a result, router R5 outputs an updated RSVP PATH message 31 to inform downstream routers that 1 Gigabit per second of bandwidth has been reserved for ring LSP 25. In response, router R6 outputs an updated RSVP PATH message 29 to inform downstream routers that 2 Gigabit per second of bandwidth, i.e., the sum of the bandwidth required for traffic 28, 33 from both pseudowires, has been reserved for ring LSP 25 within the downstream routers. As such, the resulting signaled bandwidth for ring LSP 25 is zero from routers R1-R5, 1 Gigabit per second for the portion of the ring LSP from router R5 to router R6 and 2 Gigabits per second for the portion of the ring LSP from router R6 to router R10. In this way, the signaled bandwidth of any ring LSP may increase along the downstream direction and may be asymmetric in the upstream direction.

Although described for purposes of example as one ring LSP per ring node, each node may operate as an anchor node for multiple ring LSPs. For example, if Quality of Service (QoS)-based bandwidth management with k classes is desired, k ring LSPs of a single class may be created per ring node. Alternatively, a single, k-class, DiffServ-aware ring LSP per ring node may be created. In this way, the techniques allow bandwidth for a ring LSP to be easily and dynamically managed.

Figure 6A:
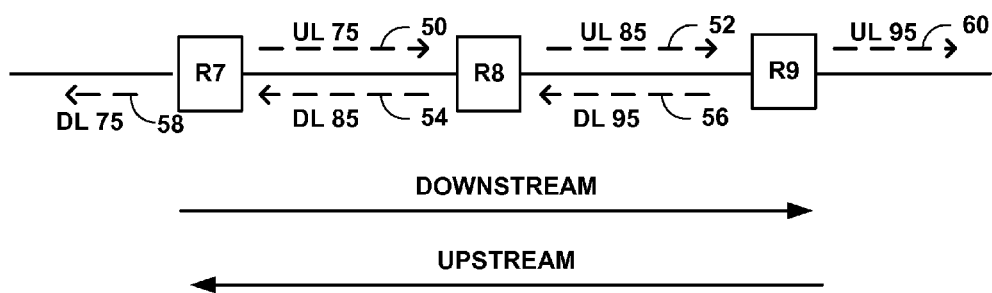
FIGS. 6A and 6B are block diagrams illustrating in further detail example control plane signaling messages and forwarding plane configuration when establishing ring LSPs.

FIG. 6A illustrates in further detail the control plane signaling messages utilized when establishing a ring LSP, such as ring LSP 25. In this example, routers R7-R9 (FIG. 2) output control plane message in accordance with a label distribution protocol, such as RSVP. In the example of FIG. 6A, router R8 allocates an upstream label UL 85 and a downstream label DL 85 for ring LSP 25. Router R8 sends upstream label UL 85 to downstream neighbor router R9 via RSVP PATH message 52 and sends downstream label 85 to upstream neighbor router R7 via RSVP RESV message 54. As described herein, router R8, which is intermediate router along ring LSP 25, need not wait for RSVP messages from neighboring routers to trigger RSVP messages 52, 54.

Other routers along ring LSP 25 operate in a similar manner. For example, router R7 allocates an upstream label UL 75 and a downstream label DL 75 for ring LSP 25 and sends upstream label UL 75 to downstream neighbor router R8 via RSVP PATH message 50 and sends downstream label 75 to upstream neighbor router R6 (not shown in FIG. 6) via RSVP RESV message 58. Similarly, router R9 allocates an upstream label UL 95 and a downstream label DL 95 for ring LSP 25 and sends upstream label UL 95 to downstream neighbor router R10 (not shown in FIG. 6A) via RSVP PATH message 60 and sends downstream label 95 to upstream neighbor router R8 via RSVP RESV message 56.

In response to receiving the RSVP messages, the routers install primary forwarding entries within internal forwarding integrated circuits that routes packets within the network including along ring LSP 25. For example, upon receiving RSVP PATH message 50, router R8 installs upstream label UL 75 within the forwarding integrated circuit. That is, router R8 may program the forwarding integrated circuit with a primary forwarding entry for ring LSP 25 as follows:

US Primary Entry: Swap UL 85 with UL 75; Output Packet to Router R7.

Similarly, upon receiving RSVP RESV message 56, router R8 installs upstream label DL 95 within the forwarding integrated circuit. That is, router R8 may program the forwarding integrated circuit with a primary forwarding entry for ring LSP 25 as follows:

DS Primary Entry: Swap DL 85 with DL 95; Output Packet to Router R9.

Note that each of these actions can occur independently. That is, ring node does not need to have received both an RSVP PATH message and an RSVP RESV message to install primary forwarding entries within the forwarding information of its forwarding integrated circuit. Further, as updated RSVP PATH and RSVP RESV messages are received with a LABEL_BINDINGS object carrying updated labels, the corresponding forwarding state is installed. Similarly, as updated RSVP PATH and RSVP RESV messages are received without the LABEL_BINDINGS object, the corresponding LFIB state is removed.

Routers along a ring LSP may also similarly install fast reroute entries in the case of a link failure or other event that prevents traffic flow. For example, upon receiving RSVP PATH message 50, router R8 installs fast reroute (FRR) forwarding entry as follows:

DS FRR: Swap DL 85 with UL 75; Output Packet to Router R7.

Figure 6B:
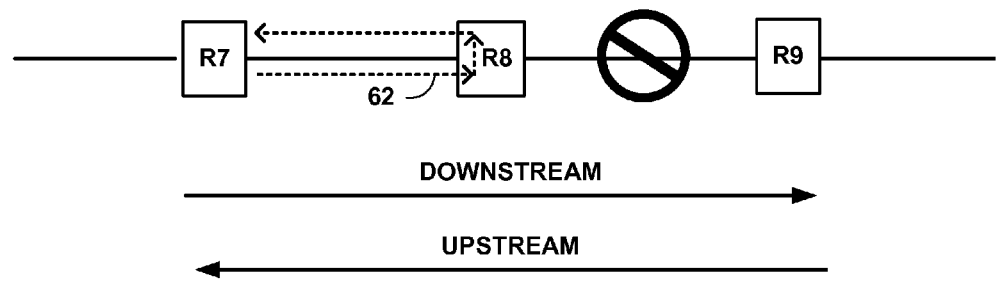

The DS primary forwarding entry is used when the downstream direction of ring LSP 25 is operational. The DS FSS forwarding entry is automatically used when a fault is detected on the downstream path and has the effect of switching packets to the upstream path. That is, in the event of a link fail in the downstream direction, as shown in FIG. 6B, router R8 is able to immediately U-turn downstream traffic 62 and direct the traffic in the upstream direction along ring LSP 25. Router R8 may also propagate notification of the error upstream, as described above, such as by sending an RSVP PATH ERR message for ring LSP 25 to router R7.

The following illustrates an example format of an enhanced RSVP PATH message that has been configured to establish ring LSPs as described herein.

| | |
|---|---|
| <Path Message> ::= | <Common Header> [ <INTEGRITY> ] |
| | <SESSION> <RSVP_HOP> |
| | <TIME_VALUES> |
| | [ <SESSION_ATTRIBUTE> ] |
| | <SENDER_TSPEC> |
| | <UPSTREAM_LABEL>, | where <SESSION> represents a session object for specifying the configuration information described herein for a ring LSP, <SENDER_TSPEC> represents the traffic specification of the sender, and <UPSTREAM_LABEL> specifies the upstream label allocated by the router sending the RSVP PATH message and may conform to the label binding object of FIG. 8. An RSVP RESV message may be similarly modified such that RSVP enabled routers can specify MPLS rings and ring LSP in accordance with the techniques described herein.

FIG. 7 illustrates an example format for an RSVP session object 70 that may be used to signal a ring LSP in accordance with the techniques described here. For example, RSVP session object 70 may be used in RSVP RESV message or an RSVP PATH message when signaling a ring LSP.

In one example, RSVP session object 80 may be of C-Type of either RING_IPv4 or RING_IPv6, which are new RSVP session types defined herein. In the example session object 80, the RING LSP ANCHOR IP ADDRESS may be the loopback address of the anchor node. The RING ANCHOR INDEX is the index of the anchor node in the ring LSP being constructed. The RING LSP ID is the unique identifier of the MPLS ring LSP, which may be different from the index of the anchor node. The RING LSP ID may, for example, be used when an anchor node has multiple ring LSPs, for example, one per QoS class. The RING ID is the unique identifier of the MPLS ring.

FIG. 8 illustrates an example format for an RSVP label bindings object 72 that may be used to signal label bindings for a ring LSP in accordance with the techniques described here. RSVP label bindings object 72 may be inserted in the RSVP PATH and RSVP RESV messages initiated by the ring LSP anchor. A ring node that receives a RSVP PATH or RSVP RESV messages for a ring LSP with the label bindings object 72 updates its own RSVP PATH and RSVP RESV messages for that ring LSP to include the label bindings object as received.

Inclusion of RSVP label bindings object 72 within a RSVP PATH and RSVP RESV messages indicates continuity of signaling from the ring anchor. An anchoring node (e.g., router R1 for ring LSP 25 of FIG. 3) automatically inserts RSVP label bindings object 72 in its PATH message for its ring LSP. Other nodes around the ring LSP, such as routers R2-R10 do not insert RSVP label bindings object 72 in the initial RSVP PATH messages they each autonomously originate. However, if an intermediate node along a given ring LSP receives an RSVP PATH message for the ring LSP that includes RSVP label bindings object 72, the intermediate router copies RSVP label bindings object 72 to its own RSVP PATH message and outputs and updated RSVP PATH message. As such, any node receiving an RSVP PATH message with RSVP label bindings object 72 knows that upstream labels are present and have been successfully allocated all the way to the anchor for the particular ring LSP, i.e., that continuity exists. If a ring node receives an updated RSVP PATH message without RSVP label bindings object 72, the node updates its own RSVP PATH message for the ring LSP to remove RSVP label bindings object 72 and outputs the updated RSVP PATH message, thereby providing an indication to downstream nodes that continuity does not exist. Similarly, RSVP RESV messages may make use of RSVP label bindings object 72 to provide an indication of continuity in the downstream direction.

Further, RSVP label bindings object 72 can be used to facilitate automatic creation of hierarchical LSPs over ring LSPs. For example, an auto-hierarchy LSP to a non-ring node, such as service node S2 of FIG. 1, can easily be created when a ring node through which the non-ring node is reachable (e.g., router R0 (6) of ring network 14B of FIG. 1) receives an RSVP message containing a label binding L to the non-ring node S2. In response, router R0 of ring network 14B allocates a label M to reach service node N2 and installs a label forwarding entry within its forwarding plane to swap M with L and forward the traffic to service node S2. Next, router R0 advertises service node S2's loopback address and label M for reaching service node S2 to all other ring nodes using the new label bindings object 72 of FIG. 8. This enables other ring nodes (e.g., routers R1-R5) to send traffic to the non-ring node using a two-label stack specified in label bindings object 72: an outer label to the ring node (router R0) through which the non-ring node (S2) is reachable (either DS or US), and the inner label M. In the example of FIG. 1, router R3 can in turn allocate a label S, install an LFIB entry to swap S with the two-label stack to service node S2, and announce S to another non-ring node, such as access node AN1. In this way, access LSP 19 may easily be created as an auto-hierarchical tunnel that allows AN1 to send traffic to S2. Other mechanisms may be used for creating a tunnel, such as targeted LDP.

The techniques described herein for signaling MPLS rings and ring LSPs are described in reference to RSVP for purposes of example. Other label distribution protocols may be used. As one example, the Label Distribution Protocol (LDP) can be used to signal ring LSPs. In this example, a ring node (router $R_i$) may announce a ring LSP for which it is operating as an anchor by sending an LDP label mapping message to its downstream and upstream neighbors in the ring in accordance with the LDP protocol. The ring node specifies, within a FEC TLV of the LDP label mapping message, the loopback address of the ring node. In the Label TLV of the LDP label mapping message, the ring node places labels for the upstream and downstream directions, respectively. In addition, the member node inserts a new Ring TLV in the message that specifies the ring identifier, the node index of the ring anchor, and an indication whether this announcement should be propagated downstream or upstream. The former indication would be sent to its downstream neighbor, the latter to its upstream. As these messages propagate around the ring, the receiving nodes can create upstream or downstream (respectively) ring LSPs anchored at router $R_i$. A router Rj sending traffic downstream to Ri, on learning of a fault in the ring in the downstream direction, can, as described herein, loop traffic back in the upstream direction to Ri, thus effecting traffic protection without the need of loop-free alternatives or other such means.

FIGS. 9-12 illustrate example message formats for discovering MPLS rings and member nodes using an interior gateway protocol (IGP), such as the Intermediate System to Intermediate System (ISIS) protocol or the Open Shortest Path First (OSPF) protocol.

Figure 9:
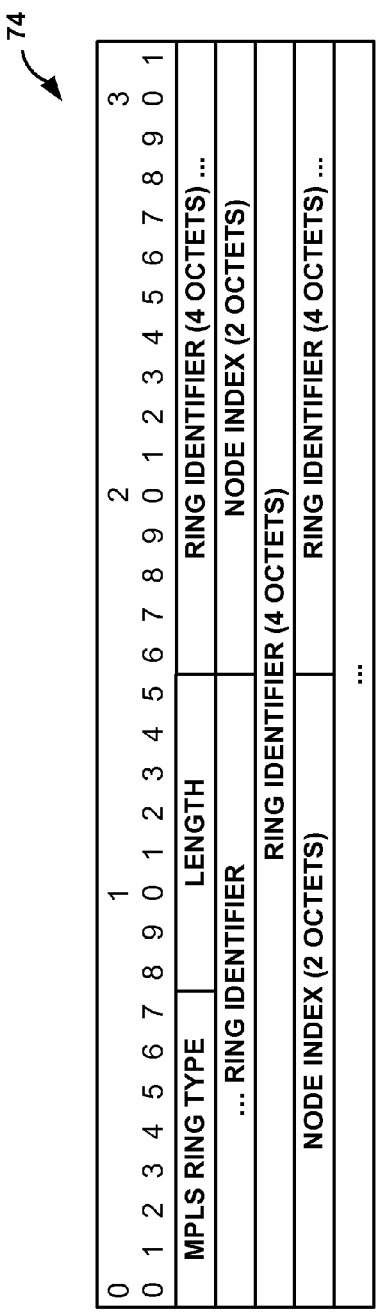
FIGS. 9-12 are block diagrams illustrating example message formats for discovering MPLS rings and member nodes using an interior gateway protocol (IGP), such as the Intermediate System to Intermediate System (ISIS) protocol or the Open Shortest Path First (OSPF) protocol.

For example, FIG. 9 illustrates a new top-level Type-Length-Value (TLV) 74 that may be included in an ISIS hello message that may be sent by a ring node to announce all of the MPLS rings of which the ring node is a member. In this example, TLV 74 first includes a Type value of 'MPLS Ring Type,' which would be a newly allocated TLV type consuming the first octet. The second octet stores the Length value, where the value would be would be 6*N octets, where N is the number of rings in which this node is participating. As shown in FIG. 9, each ring is specified by 6 octets including a ring identifier (4 octets) and a node index (2 octets), where the ring identifier specifies the identifier of an MPLS ring and the node index specifies the position of the node around the MPLS ring as described herein. The advertising node may, for example, have a different index for each of the MPLS rings specified in TLV 74. In IS-IS, TLV 74 represents a sub-TLV of an Extended IS Reachability TLV, as defined in *IS-IS Extensions for Traffic Engineering*, RFC 5305, section 3, the entire contents of which are incorporated herein.

Figure 10:
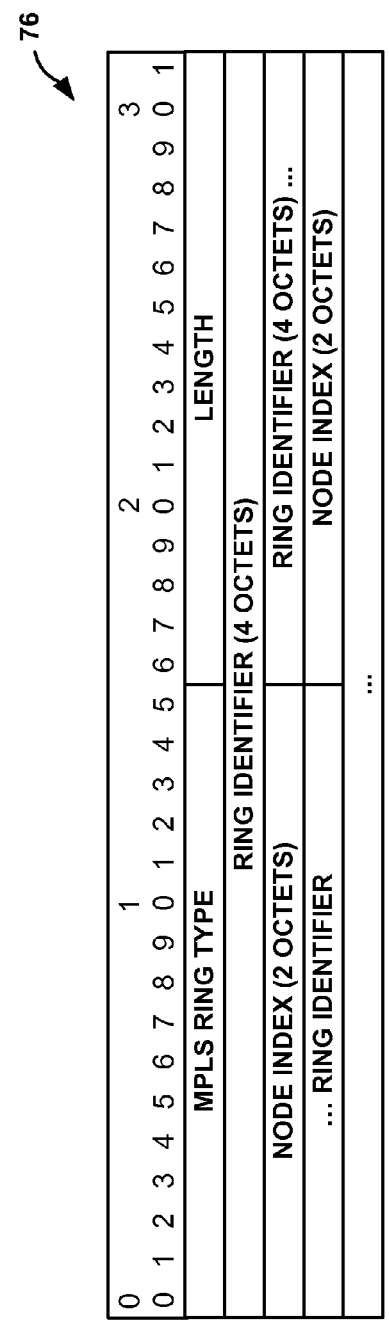

FIG. 10 illustrates an example top-level TLV 76 for use within a new OSPF link-local LSA for announcing membership within one or more MPLS rings and the position within each ring for the announcing node. As with TLV 74 for ISIS, TLV 76 for OSPF has a TLV length value of 6*N octets, where N is the number of rings in which this node is participating. In OSPF, TLV 79 represents a sub-TLV of a link TLV as specified in *Traffic Engineering (TE) Extensions to OSPF Version* 2, RFC 3630, section 2.4, the entire contents of which are incorporated herein.

Figure 11:
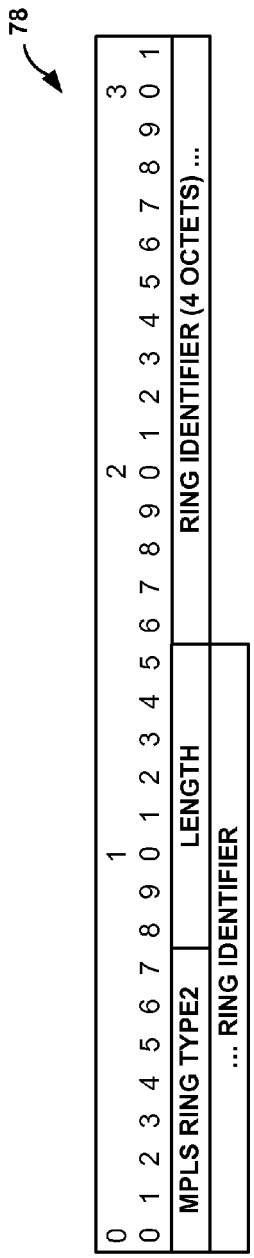
Figure 12:
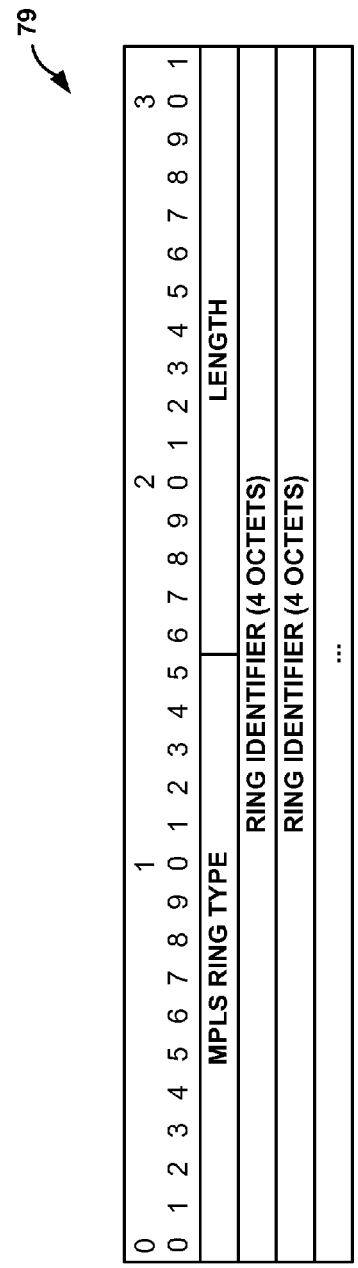

FIGS. 11 and 12 illustrate two new sub-TLVs for the IGP LSAs that are used on each interface of the node and just contain ring identifiers. As such, the new TLVs have TLV length values of 4*N octets since the ring index is not included. FIG. 11, for example, shows a new sub-TLV 78 for use in an IS-IS LSA. FIG. 12 shows a new sub-TLV 79 for use in an OSPF LSA.

Figure 13:
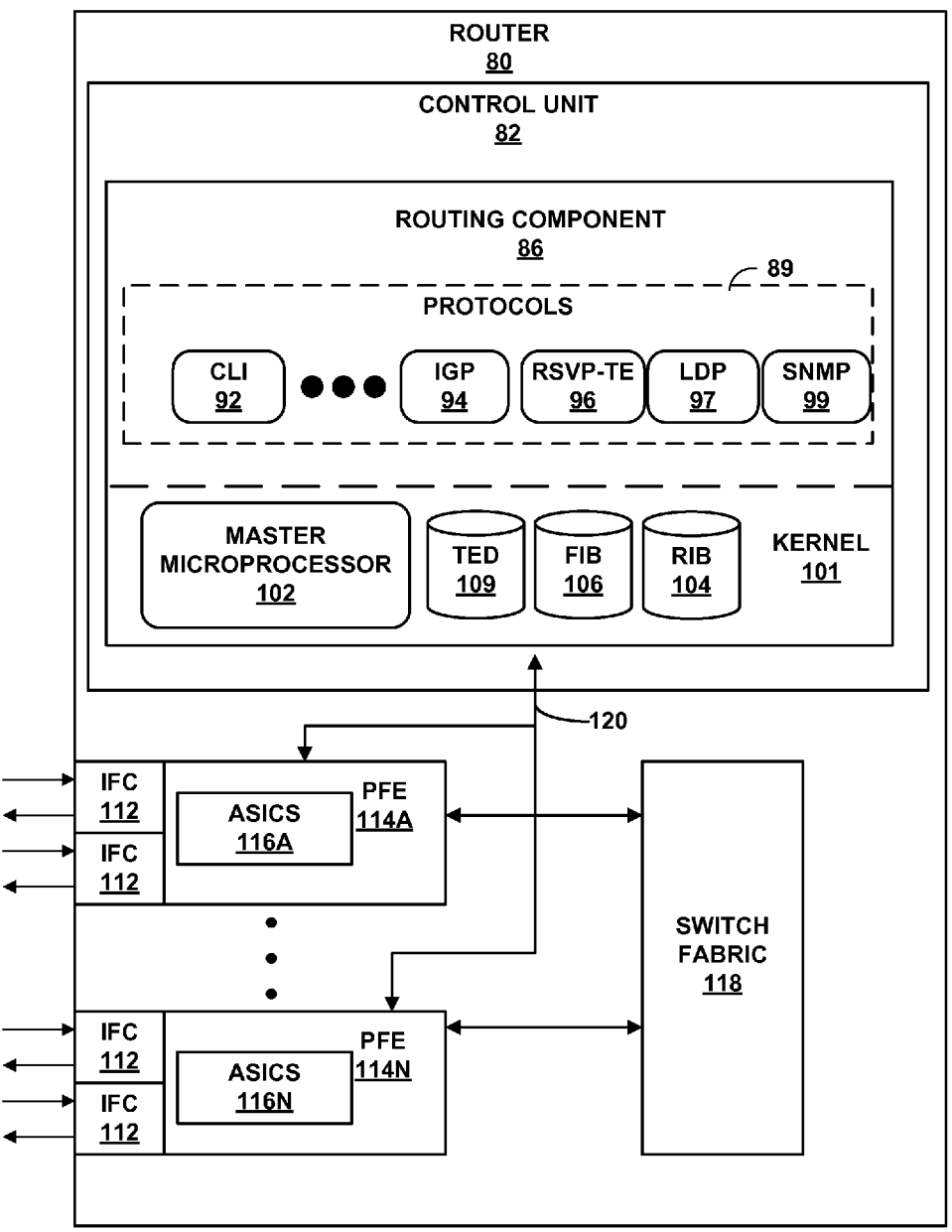
FIG. 13 is a block diagram illustrating an exemplary device, e.g., a router or gateway, capable of implementing the techniques described herein.

FIG. 13 is a block diagram illustrating an exemplary device, e.g., a router or gateway, capable of implementing the techniques described herein. Router 80 may comprise any router in a network, such as SP network 12. For example, router 80 may comprise a gateway, an edge or access router, a core router or other device illustrated herein that forwards MPLS traffic using ring LSPs in accordance with the techniques described herein.

In the example of FIG. 13, router 80 includes control unit 82 in which routing component 86 provides control plane functionality for router 80. Router 80 also includes a plurality of packet-forwarding engines 114A-114N ("PFEs 114") and a switch fabric 118 that collectively provide a data plane for forwarding network traffic. PFEs 114 receive and send data packets via interface cards 112 ("IFCs 112"). In other embodiments, each of PFEs 114 may comprise more or fewer IFCs. Although not shown, PFEs 114 may each comprise a central processing unit (CPU) and a memory. In this example, routing component 86 is connected to each of PFEs 114 by a dedicated internal communication link 120. For example, dedicated link 34 may comprise a Gigabit Ethernet connection. Switch fabric 118 provides a high-speed interconnect for forwarding incoming data packets between PFEs 114 for transmission over a network. U.S. Pat. No. 8,050,559, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

Routing component 86 provides an operating environment for execution of various protocols 89 that may comprise software processes having instructions executed by a computing environment. As described in further detail below, protocols 89 provide control plane functions for storing network topology in the form of routing tables or other structures, executing routing protocols to communicate with peer routing devices and maintain and update the routing tables, and providing management interface(s) to allow user access and configuration of router 80. Control unit 82 provides an operating environment for routing component 86 and may be implemented solely in software, or hardware, or may be implemented as a combination of software, hardware or firmware. For example, control unit 82 may include one or more processors which execute software instructions. In that case, routing component 86 may include various software modules or daemons (e.g., one or more routing protocol processes, user interfaces and the like), and control unit 82 may include a computer-readable storage medium, such as computer memory or hard disk, for storing executable instructions.

Command line interface daemon 92 ("CLI 92") provides an interface by which an administrator or other management entity may modify the configuration of router 80 using text-based commands. Simple Network Management Protocol daemon 99 ("SNMP 99") comprises an SNMP agent that receives SNMP commands from a management entity to set and retrieve configuration and management information for router 80. Using CLI 92 and SNMP 99, management entities may enable/disable and configure services, install routes, enable/disable and configure rate limiters, and configure interfaces, for example.

One or more routing protocols, such as IGP 94, maintains routing information in the form of routing information base (RIB) 104 that describes a topology of a network, and derives a forwarding information base (FIB) 106 in accordance with the routing information. In general, the routing information represents the overall topology of the network. IGP 94 interacts with kernel 101 (e.g., by way of API calls) to update RIB 104 based on routing protocol messages received by router 80. RIB 104 may include information defining a topology of a network, including one or more routing tables and/or link-state databases. Typically, the routing information defines routes (i.e., series of next hops) through a network to destinations/prefixes within the network learned via a distance-vector routing protocol (e.g., BGP) or defines the network topology with interconnected links learned using a link state routing protocol (e.g., IS-IS or OSPF). In contrast, FIB 106 is generated based on selection of certain routes within the network and maps packet key information (e.g., destination information and other select information from a packet header) to one or more specific next hops and ultimately to one or more specific output interface ports of IFCs 112. Routing component 86 may generate the FIB in the form of a radix tree having leaf nodes that represent destinations within the network. Example details of an example embodiment of a router that utilizes a radix tree for route resolution are provided in U.S. Pat. No. 7,184,437, the contents of which being incorporated herein by reference in its entirety.

Routing component 86 also provides an operating environment of one or more traffic engineering protocols to establish tunnels for forwarding subscriber packets through the ordered set of service nodes associated with different service chains. For example, RSVP-TE 96 may execute the Resource Reservation Protocol with Traffic Engineering extensions to exchange traffic engineering (TE) information, such as MPLS labels for enabling label-based packet forwarding. Routing component 86 may, as another example, execute the Label Distribution Protocol 97 to signal MPLS rings and ring LSPs as described herein. As another example, routing component 86 may use GRE or IP-based tunneling protocols to establish traffic engineered tunnels. Routing component 86 may maintain, for example, a traffic engineering database (TED) 109 to store the traffic engineering data.

Routing component 86 communicates data representative of a software copy of the FIB 106 into each of PFEs 114 to control forwarding of traffic within the data plane. This allows the software FIB stored in memory (e.g., RAM) in each of PFEs 114 to be updated without degrading packet-forwarding performance of router 80. In some instances, routing component 86 may derive separate and different software FIBs for each respective PFEs 114. In addition, one or more of PFEs 114 include application-specific integrated circuits (ASICs 116) that PFEs 114 program with a hardware-copy of the FIB based on the software FIBs (i.e., hardware versions of the software FIBs) copied to each respective PFE 114.

For example, kernel 101 executes on master microprocessor 102 and may comprise, for example, a UNIX operating system derivative such as Linux or Berkeley Software Distribution (BSD). Kernel 101 processes kernel calls from IGP 94 and RSVP-TE 96 to generate forwarding information in the form of FIB 106 based on the network topology represented in RIB 104, i.e., performs route resolution and path selection. Typically, kernel 101 generates FIB 106 in the form of radix or other lookup trees to map packet information (e.g., header information having destination information and/or a label stack) to next hops and ultimately to interface ports of interface cards associated with respective PFEs 114. FIB 106 may associate, for example, network destinations with specific next hops and corresponding IFCs 112. For MPLS-related traffic forwarding, FIB 106 stores, for a given FEC, label information that includes an incoming label, an outgoing label, and a next hop for a packet.

Master microprocessor 102 executing kernel 101 programs PFEs 114 to install copies of the FIB 106. Microprocessor 102 may comprise one or more general- or special-purpose processors such as a digital signal processor (DSP), an application specific integrated circuit (ASIC), a field programmable gate array (FPGA), or any other equivalent logic device. Accordingly, the terms "processor" or "controller," as used herein, may refer to any one or more of the foregoing structures or any other structure operable to perform techniques described herein. Example details of an example embodiment of a router in which a processor programs one or more forwarding components are provided in U.S. Pat. No. 7,990,993, the contents of which being incorporated herein by reference in its entirety.

In this example, ASICs 116 are microcode-controlled chipsets (i.e., forwarding circuits) programmably configured by a slave microprocessor executing on each of PFEs 114. When forwarding packets, control logic with each ASIC 116 traverses the forwarding information (FIB 106) received from routing component 86 and, upon reaching a FIB entry for the packet (e.g., a leaf node), microcode-implemented control logic 56 automatically selects a forwarding next hop and processes the packets in accordance with the operations defined within the next hop. In this way, ASICs 116 of PFEs 114 process packets by performing a series of operations on each packet over respective internal packet forwarding paths as the packets traverse the internal architecture of router 80. Operations may be performed, for example, on each packet based on any of a corresponding ingress interface, an ingress PFE 114, an egress PFE 30, an egress interface or other components of router 80 to which the packet is directed prior to egress, such as one or more service cards. PFEs 114 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of PFEs 114 arranges forwarding structures as next hop data that can be chained together as a series of "hops" along an internal packet forwarding path for the network device. In many instances, the forwarding structures perform lookup operations within internal memory of ASICs 116, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 116 determines the manner in which a packet is forwarded or otherwise processed by PFEs 114 from its input interface on one of IFCs 112 to its output interface on one of IFCs 112.

In general, kernel 101 may generate FIB 106 and thereby program ASICs 116 to store forwarding structures associated with each service chain. For example, ASICs 116 may be configured with forwarding information that specifies traffic engineering information, such as IP header information or MPLS labels, as well as operations for causing programmable ASICs 116 to encapsulate subscriber packets in accordance with the forwarding information. In this way, ASICs 116 may process subscriber packets to select particular service paths for each packet and encapsulate the subscriber packets in accordance with the selected service paths. Routing component 86 may generate RIB 104 and FIB 106 to associate subscriber packet flows with particular service paths based on one or more service profiles associated with each subscriber, as may be received from an Authentication, Authorization and Accounting (AAA) server, a policy controller, Software-Defined Network (SDN) controller or other network element.

In general, RSVP-TE 96, LDP 97 and/or IGP 94 operates in accordance with the techniques described herein. For example, RSVP-TE 96 may maintain routing communication sessions with peer routers and output control-plane messages, e.g., RSVP PATH messages and RSVP RESV messages as described herein to signal membership of ring LSPs. Moreover, RSVP-TE 96 may program RIB 104 with forwarding labels for LSP rings as learned from the peer router, which in turn causes kernel 101 to program forwarding ASICS 116 with primary and backup forward entries for forwarding MPLS traffic as described herein. Further, as described herein, RSVP-TE 96 may implement the automatic bandwidth management functions for LSP rings based on provisioning information received via CLI 92 or SNMP 99, for example. In addition, or alternatively, LDP 97 may perform these functions. IGP 94 may be extended as described herein for auto-discovery of MPLS rings and ring LSPs.

The architecture of router 80 illustrated in FIG. 13 is shown for example purposes only. This disclosure is not limited to this architecture. In other examples, router 80 may be configured in a variety of ways. In one example, some of the functionally of control unit 82 may be distributed within IFCs 112. Control unit 82 may be implemented solely in software, or hardware, or may be implemented as a combination of software, hardware, or firmware. For example, control unit 82 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Control unit 82 may further include one or more processors which execute software instructions stored on a computer readable storage medium, such as random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, magnetic media, optical media, or other computer-readable storage media. In some instances, the computer-readable storage medium may include instructions that cause a programmable processor to perform the techniques described herein.

Figure 14:
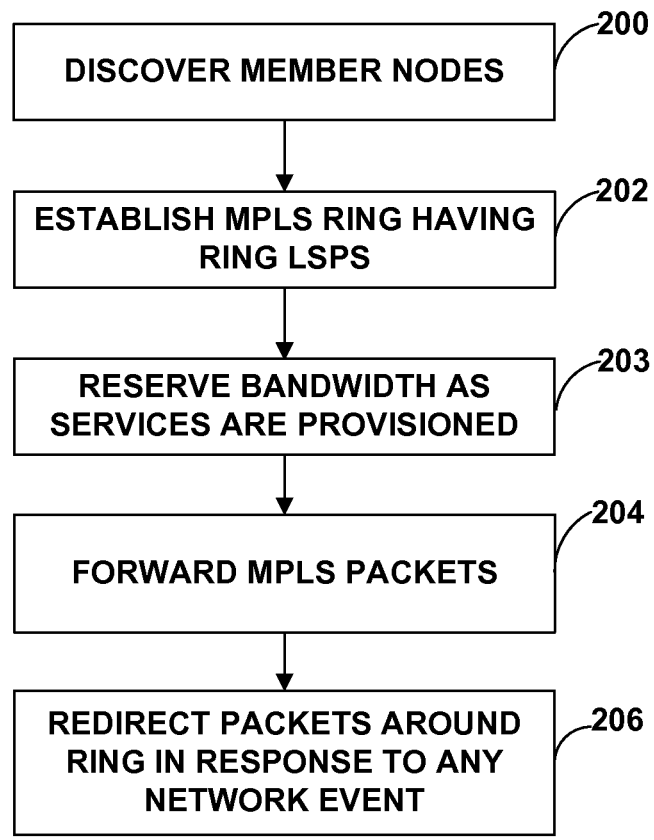
FIG. 14 is a flowchart illustrating example operation of a network device in accordance with the techniques described herein.

FIG. 14 is a flowchart illustrating example operation of a network device, such as a router, in accordance with the techniques described herein.

As shown in FIG. 14, the router executes a routing protocol, such as an interior gateway protocol (IGP), to discover, using the IGP, neighboring routers that are also designated as members of a multi-protocol label switching (MPLS) ring associated with a ring network (200). For example, the router may receive enhanced IGP messages from two or more of the routers and select, based on the indexes within the enhanced IGP messages, an upstream neighboring one of the routers and a downstream neighboring one of the routers for the ring LSPs of the MPLS ring.

Responsive to discovering the neighboring routers that are members of the MPLS ring, the router establishes a plurality of ring label switched paths (LSPs) for the MPLS ring (202). Each of the ring LSPs are configured to transport MPLS packets around the ring network to a different one of the routers that is designated as an egress router for the respective ring LSP. Moreover, each of the ring LSPs is configured as a multipoint-to-point (MP2P) LSP for which any of the routers within the ring network can operate as an ingress to source packet traffic into the ring LSP for transport to the respective egress router for the ring LSP. For example, a processor of the router may be configured to output, for each of the ring LSPs, one or more messages in accordance with a label distribution protocol to signal membership in the MPLS ring and the ring LSPs. For each of the ring LSPs, the messages output by the processor includes an identifier of the MPLS ring, an identifier for the respective one of the plurality of routers that operates as the egress for the ring LSP and label bindings specifying one or more MPLS labels associated with the ring LSP and, for each of the MPLS labels, a network address to which network traffic having the respective MPLS label will be forwarded by the forwarding component upon receipt of the network traffic.

When establishing the LSPs, the router may specify bandwidth requirements in a downstream direction to the egress router for any packet traffic to be sourced into the ring LSP by the router (204). For example, each of the messages output by the routers specifies bandwidth requirements in a downstream direction to the egress router for any packet traffic to be sourced into the ring LSP by the respective one of the routers around the ring LSP. Moreover, after establishing the ring LSPs and responsive to receiving configuration data provisioning additional network traffic to be sourced by the router into the ring LSP, the router may output an updated message to reserve bandwidth in the downstream direction around the ring LSP for the additional network traffic. Further, as services are provisioned upstream from the router, the router may reserve bandwidth in the downstream direction around the ring LSP to the egress for the sum of the network traffic to be sourced by the router and any network traffic to be sourced by any of the routers that are positioned in the upstream direction from the router.

The router forwards network traffic as MPLS packets around the ring network in accordance with the ring LSPs (204). Further, in response to a network event that would prevent the MPLS packets from reaching the egress router in the downstream direction, the router may automatically redirect the MPLS packets from a downstream direction of the ring LSP to the upstream direction of the ring LSP to forward the MPLS packets around the ring in the upstream direction to the egress router (206). For example, when forwarding the MPLS packets in the downstream direction, the router may receive the MPLS packets from an upstream neighboring one of the routers, swap the downstream label on each of the MPLS packets with a downstream label advertised by a downstream neighboring one of the router and forward the MPLS packet in the downstream direction around the ring LSP. When automatically redirecting the MPLS packets in response to a network event, the router may receive the MPLS packets from the upstream neighboring one of the routers, swap the downstream label on each of the MPLS packets with the upstream label advertised by the upstream neighboring one of the router and forward the MPLS packet back in the upstream direction around the ring LSP.

Various embodiments of the invention have been described. These and other embodiments are within the scope of the following claims.

The invention claimed is:

1. A method comprising:
outputting, with a plurality of routers connected as a ring network, a plurality of messages in accordance with a label distribution protocol to establish a multi-protocol label switching (MPLS) ring having at least one ring label switched path (LSP) to transport MPLS packets around the ring network to one of the routers operating as an egress router for the ring LSP, wherein the ring LSP comprises a bidirectional multipoint-to-point (MP2P) LSP for which any of the routers within the ring network can operate as an ingress to source packet traffic into the ring LSP for transport in an upstream direction and a downstream direction around the ring network to the egress router for the ring LSP, and wherein each of the messages output by the routers specifies bandwidth requirements in a downstream direction to the egress router for any packet traffic to be sourced into the ring LSP by the respective one of the routers around the ring LSP;
after establishing the ring LSP, receiving, with a first intermediate one of the routers around the ring LSP, first configuration data provisioning additional network traffic to be sourced by the first intermediate one of the routers into the ring LSP;
responsive to receiving the first configuration data, outputting an updated message with the first intermediate one of the routers to reserve bandwidth in the downstream direction around the ring LSP for the additional network traffic; and
forwarding network traffic as MPLS packets around the ring network in accordance with the ring LSP.

2. The method of claim 1, further comprising:
after outputting an updated message with the first intermediate one of the routers, receiving, with a second intermediate one of the routers positioned upstream from the first intermediate one of the routers, second configuration data provisioning additional network traffic to be sourced by the second intermediate one of the routers into the ring LSP;
responsive to receiving the second configuration data, outputting a second updated message with the second intermediate one of the routers to reserve bandwidth in the downstream direction around the ring LSP to the egress for the additional network traffic to be sourced by the second intermediate one of the routers; and
responsive to the second updated message, outputting a third updated message with the first intermediate one of the routers to reserve bandwidth in the downstream direction around the ring LSP to the egress for the sum of the additional network traffic to be sourced by the first intermediate one of the routers and the additional network traffic to be sourced by the second intermediate one of the routers.

3. The method of claim 1, wherein the messages output by each of the routers includes an identifier of the MPLS ring and an identifier for the respective one of the plurality of routers that operates as the egress for the ring LSP.

4. The method of claim 1, wherein the messages output by each of the routers includes label bindings specifying one or more MPLS labels associated with the ring LSP and, for each of the MPLS labels, a network address to which network traffic having the respective MPLS label will be forwarded.

5. The method of claim 1, wherein each of the routers around the ring LSP autonomously outputs respective ones of the plurality of messages without having to first receive any of the messages from any other ones of the routers.

6. The method of claim 1, wherein outputting the messages comprises:
outputting, from each of the routers and for each of the ring LSPs, a first label distribution message in the upstream direction with respect to the ring network, the first label distribution messages specifying a downstream label to be applied by an upstream neighboring one of the routers when forwarding the MPLS packets for the ring LSP in the downstream direction to the respective router; and outputting, from each of the routers and for each of the ring LSPs, a second label distribution message in the downstream direction with respect to the ring network, the second label distribution message specifying an upstream label to be applied by a downstream neighboring one of the routers when forwarding the MPLS packets for the ring LSP in the upstream direction to the respective router.

7. The method of claim 1, wherein outputting, with the plurality of routers, a plurality of messages in accordance with a label distribution protocol comprises outputting the messages in accordance with the Resource Reservation Protocol with Traffic Engineering extensions (RSVP-TE).

8. The method of claim 1, wherein outputting, with the plurality of routers, a plurality of messages in accordance with a label distribution protocol comprises outputting the messages in accordance with the Label Distribution Protocol (LDP).

9. A router comprising:
a plurality of physical interfaces interconnecting the router as one of a plurality of routers forming a ring network;
a processor executing a label distribution protocol to communicate with the other routers using messages to establish a ring label switched path (LSP) configured to transport multi-protocol label switching (MPLS) packets around the ring network to one of the routers operating as an egress router for the ring LSP, wherein the processor is configured to establish the ring LSP as a bidirectional multipoint-to-point (MP2P) LSP for which any of the routers within the ring network can operate as an ingress to source packet traffic into the ring LSP for transport in an upstream direction and a downstream direction around the ring network to the egress router for the ring LSP, wherein each of the messages specifies bandwidth requirements in a downstream direction to the egress router for any packet traffic to be sourced into the ring LSP by the router, and wherein the processor is configured to, after establishing the ring LSP and responsive to receiving configuration data provisioning additional network traffic to be sourced by the router into the ring LSP, output a first updated message to reserve bandwidth in the downstream direction around the ring LSP for the additional network traffic; and
a forwarding component to forward network traffic as MPLS packets around the ring network in accordance with the ring LSP.

10. The router of claim 9, wherein the processor is configured to
after outputting the first updated message, receiving a second updated message from an intermediate one of the routers positioned in an upstream direction from the router, wherein the second updated message reserves bandwidth in the downstream direction around the ring LSP to the egress for the additional network traffic to be sourced by the intermediate one of the routers, and
responsive to receiving the second updated message, outputting a third updated message with the router to reserve bandwidth in the downstream direction around the ring LSP to the egress for the sum of the additional network traffic to be sourced by the router and the additional network traffic to be sourced by the first intermediate one of the routers that is positioned in the upstream direction from the router.

11. The router of claim 9, wherein the messages output by each of the routers includes an identifier of the MPLS ring and an identifier for the respective one of the plurality of routers that operates as the egress for the ring LSP.

12. The router of claim 9, wherein for each of the ring LSPs, the messages output by each of the routers includes label bindings specifying one or more MPLS labels associated with the ring LSP and, for each of the MPLS labels, a network address to which network traffic having the respective MPLS label will be forwarded.

13. The router of claim 9, wherein the processor autonomously outputs the messages to establish the ring LSP without having to first receive any of the messages from any other ones of the routers.

14. The router of claim 9, wherein the processor outputs, for each of the ring LSPs:
a first label distribution message in the upstream direction with respect to the ring network, the first label distribution messages specifying a downstream label to be applied by an upstream neighboring one of the routers when forwarding the MPLS packets for the ring LSP to the router in the downstream direction; and
a second label distribution message in the downstream direction with respect to the ring network, the second label distribution message specifying an upstream label to be applied by a downstream neighboring one of the routers when forwarding the MPLS packets for the ring LSP to the router in the upstream direction.

15. The router of claim 9, wherein the processor outputs the plurality of messages in accordance with the Resource Reservation Protocol with Traffic Engineering extensions (RSVP-TE).

16. The router of claim 9, wherein the processor outputs the plurality of messages in accordance with the Label Distribution Protocol (LDP).

17. A computer-readable storage device storing instructions that cause a processor of a router to:
output messages in accordance with a label distribution protocol to establish an multi-protocol label switching (MPLS) ring label switched path (LSP) configured to transport MPLS packets around the ring network to one of the routers operating as an egress router for the ring LSP, wherein the ring LSP comprises a bidirectional multipoint-to-point (MP2P) LSP for which any of the routers within the ring network can operate as an ingress to source packet traffic into the ring LSP for transport in an upstream direction and a downstream direction around the ring network to the egress router for the ring LSP, and wherein the messages specifies bandwidth requirements in a downstream direction to the egress router for any packet traffic to be sourced into the ring LSP by the router;
after establishing the ring LSP and responsive to receiving configuration data provisioning additional network traffic to be sourced by the router into the ring LSP, output a first updated message to reserve bandwidth in the downstream direction around the ring LSP for the additional network traffic; and
install forwarding information within a forwarding component of the router to forward traffic as MPLS packets around the ring network in accordance with the ring LSP.

* * * * *